US 11,383,332 B2

(12) United States Patent
Herren

(10) Patent No.: US 11,383,332 B2
(45) Date of Patent: Jul. 12, 2022

(54) FIXTURES FOR PIPE INSTALLATION, SEALING AND SECURITY

(71) Applicant: Gerald R. Herren, Cookeville, TN (US)

(72) Inventor: Gerald R. Herren, Cookeville, TN (US)

(\*) Notice: Subject to any disclaimer, the term of this patent is extended or adjusted under 35 U.S.C. 154(b) by 199 days.

(21) Appl. No.: 16/734,238

(22) Filed: Jan. 3, 2020

(65) Prior Publication Data

US 2020/0139495 A1 May 7, 2020

Related U.S. Application Data

(62) Division of application No. 15/710,320, filed on Sep. 20, 2017, now Pat. No. 10,562,139, which is a division of application No. 13/261,588, filed as application No. PCT/US2011/046977 on Aug. 8, 2011, now Pat. No. 9,802,282.

(60) Provisional application No. 61/373,250, filed on Aug. 12, 2010.

(51) Int. Cl.
*B23P 19/00* (2006.01)
*F16L 1/06* (2006.01)
*F16L 55/115* (2006.01)

(52) U.S. Cl.
CPC ............... *B23P 19/00* (2013.01); *F16L 1/06* (2013.01); *F16L 55/1157* (2013.01); *Y10T 29/53* (2015.01)

(58) Field of Classification Search
CPC ....... B29C 57/00; B29C 57/02; B29C 57/025; B29C 57/04; Y10T 29/5367; Y10T 29/53678; Y10T 29/53917; Y10T 29/53987; F16L 1/09; F16L 1/10; B66C 1/425; B66C 1/427; B66C 1/625; B66C 1/42

See application file for complete search history.

(56) References Cited

U.S. PATENT DOCUMENTS

| 986,297 | A | | 3/1911 | Kinkade |
|---|---|---|---|---|
| 1,548,161 | A | | 8/1925 | Newson |
| 2,667,139 | A | | 1/1954 | Campbell |
| 3,104,681 | A | | 9/1963 | Gray |
| 3,586,056 | A | | 6/1971 | Kipp et al. |
| 3,713,463 | A | | 1/1973 | Bywater |
| 4,233,697 | A | | 11/1980 | Cornwall |
| 4,403,938 | A | \* | 9/1983 | Seach ..................... B29C 57/04 425/393 |
| 4,418,458 | A | \* | 12/1983 | Hunter ................... B21D 39/04 29/237 |

(Continued)

FOREIGN PATENT DOCUMENTS

GB 2112484 A \* 7/1983 ............. B25B 27/10

OTHER PUBLICATIONS

PCT/US2011/046977, Written Opinion (dated Jan. 17, 2012).

*Primary Examiner* — Tyrone V Hall, Jr.
(74) *Attorney, Agent, or Firm* — Baker Donelson; Carl M. Davis, II

(57) ABSTRACT

These fixtures aid in installing, sealing and securing pipe. Specifically, the invention aids in mating bell & spigot joints and securely capping open pipe ends of standard polyvinyl chloride (PVC), polyethylene (PE), and acrylonitrile-butadiene-styrene (ABS) pipe products as well as non-plastic piping by enabling equalized full circumference pressure on pipe ends to nudge, seal and/or secure pipe ends during installation or decommissioning.

3 Claims, 39 Drawing Sheets

(56) References Cited

U.S. PATENT DOCUMENTS

| | | |
|---|---|---|
| 4,501,301 A | 2/1985 | Snow, Sr. et al. |
| 5,303,741 A | 4/1994 | Gauger |
| 5,329,971 A | 7/1994 | Condon |
| 5,437,309 A | 8/1995 | Timmons |
| 5,850,854 A | 12/1998 | Carroll |
| 6,280,119 B1 * | 8/2001 | Ryan ................ B66C 1/425 294/104 |
| 6,286,553 B1 | 9/2001 | Morgan |
| 6,725,468 B2 | 4/2004 | Molina |
| 7,481,245 B1 | 1/2009 | Griffin |
| 7,624,759 B1 | 12/2009 | Ismert et al. |
| 9,802,282 B2 | 10/2017 | Herren |
| 2002/0139551 A1 | 10/2002 | Mewes |
| 2008/0023960 A1 | 1/2008 | Carmichael |
| 2010/0200098 A1 | 8/2010 | Zeyfang |

\* cited by examiner

FIXTURES FOR PIPE INSTALLATION, SEALING AND SECURITY

CROSS-REFERENCE TO RELATED APPLICATIONS

This application claims priority from U.S. Provisional Patent 61/373,250 filed Aug. 12, 2010.

TECHNICAL FIELD

This invention relates to devices that aid in installing, sealing and securing pipe. Specifically, the invention aids in mating bell & spigot joints of standard polyvinyl chloride (PVC), polyethylene (PE), and acrylonitrile-butadiene-styrene (ABS) pipe products and also non-plastic piping by enabling equalized full circumference pressure on pipe ends to nudge, seal and/or secure pipe ends during installation or decommissioning.

BACKGROUND OF THE INVENTION

Piping systems are prevalent throughout our everyday world. Most of us think of piping systems as underground structures used to convey liquids of one sort or another. To the novice, the concept of pipeline installation underground sounds relatively straight forward: a) dig a trench b) lay the pipe in the trench, and c) fill the trench back in. While this simplified perspective of pipeline construction may be appealing, it does not begin to address the concepts involved in the underground installation of a pipeline.

The installation procedure consists of trench floor preparation, providing a sufficiently stable working platform, and meeting the design grade requirements. Following pipe placement, backfill material which has been selected with regards to potential material migration, required density, depth of cover, weight of soil and surcharge loads must be considered. Sealing and securing pipe ends to prevent contamination during installation and when piping is unattended is also required.

A particularly difficult step in larger pipe installation is connecting pipe sections at the joints. Seamless pipe with a factory-installed gasket requires specific steps to be followed to ensure proper installation and performance of the pipe:

1. Clean bell and spigot. Both bell and spigot must be free of any dirt or foreign matter to ensure proper sealing between the gasket and the bell surface. The compressed gasket is moving along the bell interior; therefore, cleaning of the interior bell surface is critical. The spigot must be cleaned to beyond the reference mark.
2. Check the gasket. Make sure that the gasket has not been twisted, turned or damaged in any manner. If the gasket is missing, install a replacement gasket on the spigot.
3. Lubricate the bell. The entire inside circumference of the bell should be covered with a thin film of lubricant. Do not lubricate the spigot end on the gasket. Apply the lubricant with a cloth, sponge, glove or brush.
4. Align pipes before joining. Pipe assemblies can be made by hand; by using a bar and block, lever pullers or hydraulic jacks; or, if necessary, a backhoe bucket, but only with great care. If using a backhoe, place a 4"×4" [100 mm×100 mm] board or plank between the backhoe bucket and the edge of the pipe. The backhoe operator will not be able to see if the assembly is complete, so a helper should be located at the joint to signal when proper assembly occurs. Do not apply force directly to the edge of the pipe. It is good practice to lay pipe with bells forward (upstream) so you will pull the spigot into the bell; brace the bell end while you carefully push the spigot end into the bell up to the reference mark on the spigot. Upon completion of the joint, the reference mark should be flush with the bell end of the pipe and remain visible. Do not assemble the joint beyond the reference point. Over-assembly of the joint could damage the bell of this or adjacent pipe—the joint may lose its flexibility and leak, or the spigot may squeeze down into the neck of the bell and thereby reduce the pipe's internal diameter. The fixtures taught herein will improve pipe installation methods and pipe joint integrity.

Also, when contaminated piping is decommissioned, the surfactant used to immobilize internal contamination can off-gas or leach and damage the environment. Ends of pipe sections must be sealed against liquid or gas excursions prior to storage. Fixtures taught herein will enable safe pipe decommissioning of all types of piping materials including metal and plastic.

BRIEF SUMMARY OF THE INVENTION

In accordance with one aspect of the present invention, the foregoing and other objects are achieved by a bell boss protective end cap fixture used for applying full circumference pressure to the pipe end during belling.

In accordance with another aspect of the present invention, the foregoing and other objects are achieved by a pipe security cap fixture used for capping and sealing open pipe ends to prevent contamination and access to the pipe interior.

In accordance with another aspect of the present invention, the foregoing and other objects are achieved by a pipe brake fixture used for holding pipe joints in a belled position while applying belling pressure to subsequent pipe sections of the pipeline.

In accordance with another aspect of the present invention, the foregoing and other objects are achieved by a pipe plate fixture used for applying full circumference pressure to the pipe end during belling.

In accordance with another aspect of the present invention, the foregoing and other objects are achieved by a compressive rib fixture used for capping a pipe by applying pressure the resilient ribs and securing the fixture on the pipe for low pressure applications.

In accordance with another aspect of the present invention, the foregoing and other objects are achieved by a secure locking band fixture for capping a pipe by applying circumferential banding pressure on the resilient insert and affixing the fixture to the pipe for medium pressure applications.

In accordance with another aspect of the present invention, the foregoing and other objects are achieved by a secure locking band with segmented grip arms used for capping a pipe with circumferential banding pressure being applied at in least two separate locations on the pipe.

In accordance with another aspect of the present invention, the foregoing and other objects are achieved by a resting bell boss suitable for temporary capping of pipe ends.

In accordance with another aspect of the present invention, the foregoing and other objects are achieved by a resilient bucket with a protective end cap ratchet banded around the resilient bucket suitable for low to medium pressure applications.

DETAILED DESCRIPTION OF THE INVENTION

Figure 1:
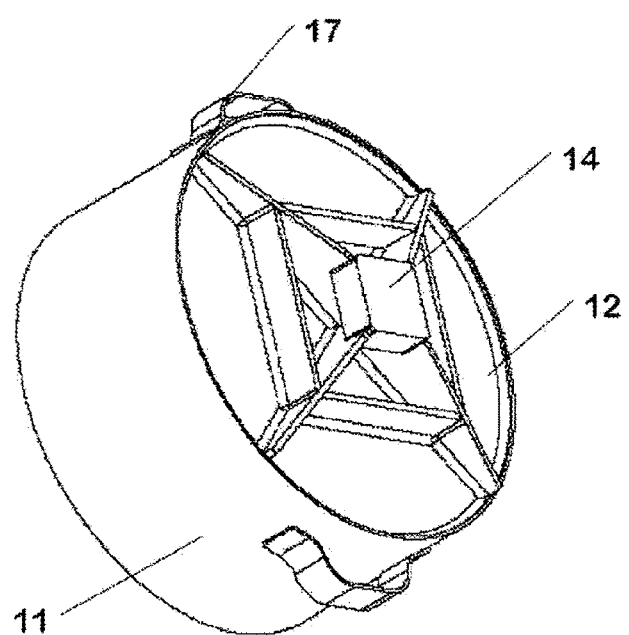
FIG. 1 is an isometric of the bell boss protective end cap fixture seen from the closed end striking surface.
Figure 2:
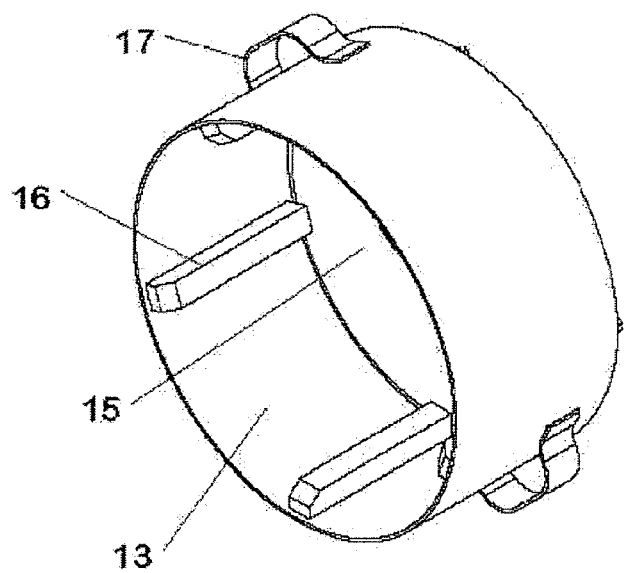
FIG. 2 is an isometric of the bell boss protective end cap fixture seen from the open end.

Referring to FIGS. 1 and 2, a pipe protective end cap fixture comprising a cylindrical body 11 with an inside surface and outside surface, the end cap further comprising a closed end 12 and an open end 13, the closed end further comprising an outer surface and an inner surface, a striker projection 14 disposed on the closed end 12 outer surface, a resilient disc 15 disposed on the closed end 12 inner surface, at least two resilient ribs 16 disposed on the cylindrical body 11 inside surface, and a means for lifting and positioning 17 the end cap.

The pipe protective end cap fixture, also referred to as a bell boss, provides pipe installers a device to safely apply belling pressure to the full circumference pipe end thereby avoiding pipe damage. The bell boss is slipped over the pipe end until the pipe end is in full circumference contact with the resilient disc positioned inside the bell boss end cap. The resilient disc can be made from neoprene rubber or other cushioned material that acts as a protective layer for the pipe end during pipe movement. Resilient ribs, that can be wedge shaped, are secured around the inside diameter of the bell boss to grab the outside diameter of the pipe section and position the bell boss for striking. A striker projection provides a durable surface to hit with a sledge hammer, or other heavy gear, thereby nudging the pipe in the direction of the pipe center axis and eventually belling the pipe with a mating pipe section. Multiple strikes are normally required to reach final belled position as noted by markings on the pipe. Typically, the bell boss is positioned on the belled end of a pipe so that the spigot end of the pipe is forced into a second pipe section's belled end. However, the bell boss can be used on either end of the pipe, any pipe opening or coupling. When the pipe section is belled into final position, the bell boss is typically removed and used similarly for subsequent sections of pipe. The bell boss can also remain on the belled pipe as a protective cover until the subsequent pipe section is positioned for belling thereby preventing dirt, rodents, or other contamination from entering the belled pipe section.

The bell boss is also used in conjunction with a backhoe for pipe installation. The backhoe provides the belling force on the striker to nudge the pipe section into final belled position. The backhoe is used to lift and position the bell boss in the ditch during installation.

Figure 3:
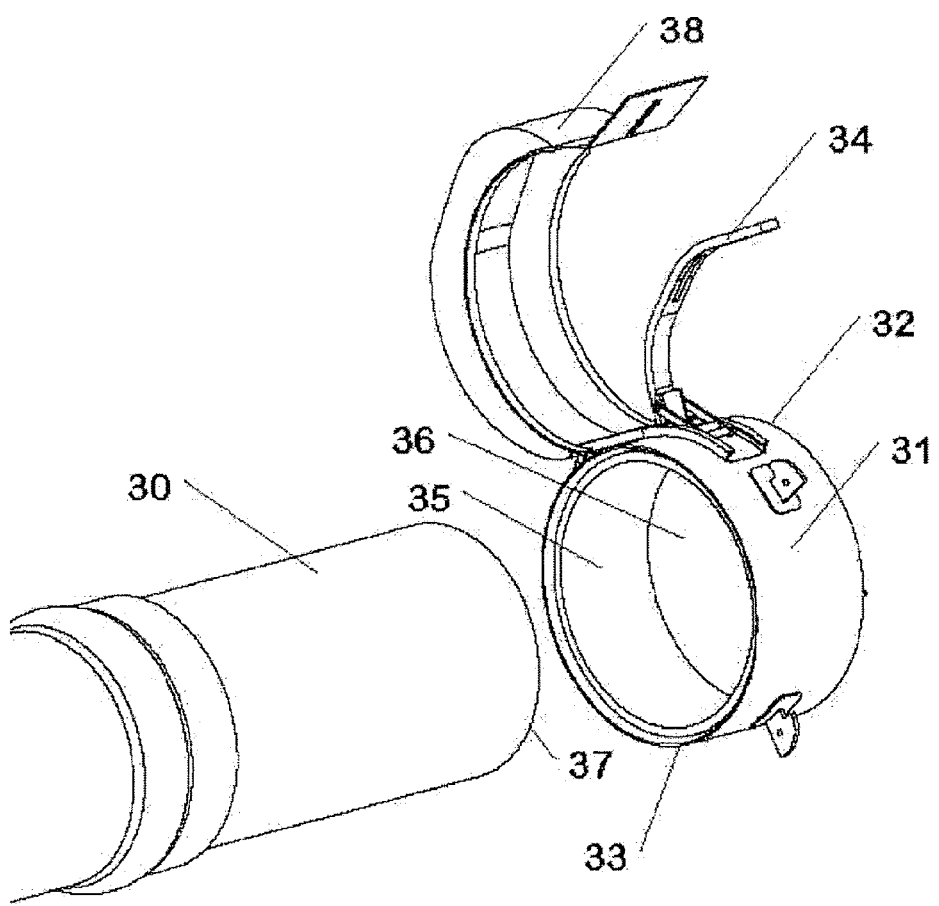
FIG. 3 is an isometric of the pipe security cap fixture in the full open position ready to receive the pipe.
Figure 4:
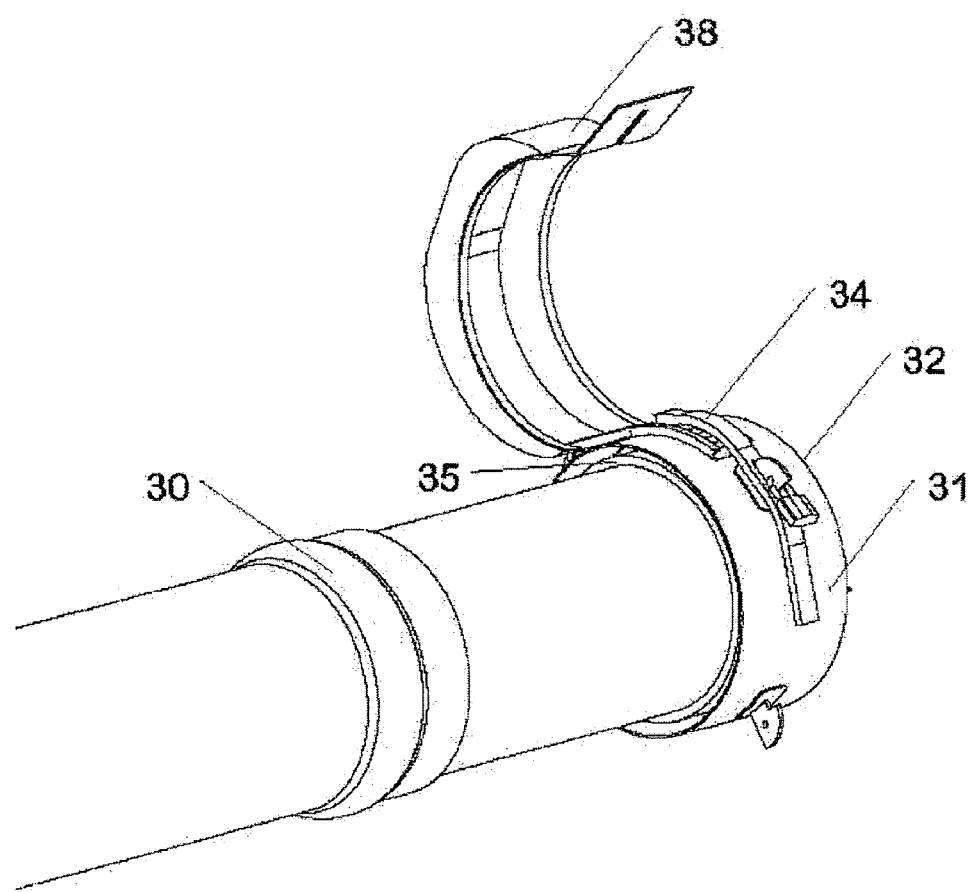
FIG. 4 is an isometric of the pipe security cap fixture in the latched position secured to the pipe.
Figure 5:
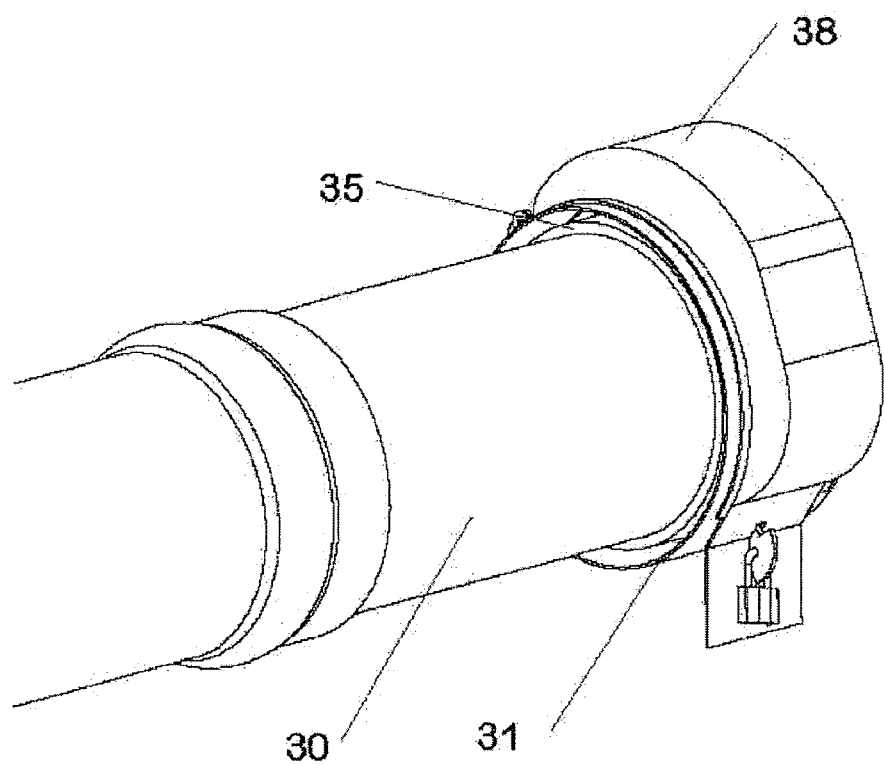
FIG. 5 is an isometric of the pipe security cap fixture in the latched position with the security cover in locked position.

Referring to FIGS. 3-5, a pipe security cap fixture comprising a pipe 30, a cylindrical body 31 with an inside surface and outside surface, the security cap further comprising a closed end 32 and an open end 33, the closed end further comprising an outer surface and an inner surface, a locking clamp 34 disposed on the cylindrical body 31 outer surface, at least one compression band 35 disposed on the cylindrical body 31 inner surface and linked to the locking clamp 34, a resilient disc 36 disposed on the closed end 32 inner surface, a means for sealing 37 the resilient disc 36 to the pipe 30, a locking security cover 38 disposed on the cylindrical body 31 outer surface and enclosing the locking clamp 34.

The security cap fixture is used to seal and protect open pipe sections left unattended or that might be subject to contamination during installation. The security cap fixture uses compression band(s), similar to a pipe filter wrench, to friction hold the fixture to the pipe end. Locking clamp(s) are used to close and lock the bands into position. Locking security cover(s) prevent tampering with the fixture and seal against the pipe outer surface to prevent contamination from entering fixture penetrations.

The security cap fixture can also serve to seal pipe ends during decontamination and decommissioning of pipe sections. A sealant is provided at the interface between the pipe end and the fixture to prevent out-gassing or leaching of internal pipe contents to the ambient. The sealant can be adhesive applied using bursting containers inside the pipe that release the sealant when the fixture reaches final position. The sealant can also be expanding foam, such as "Great Stuff", with controlled expansion at the interface. The sealant can be applied to the interface before the fixture is mounted or after mounting using sealant ports in the fixture.

Figure 6:
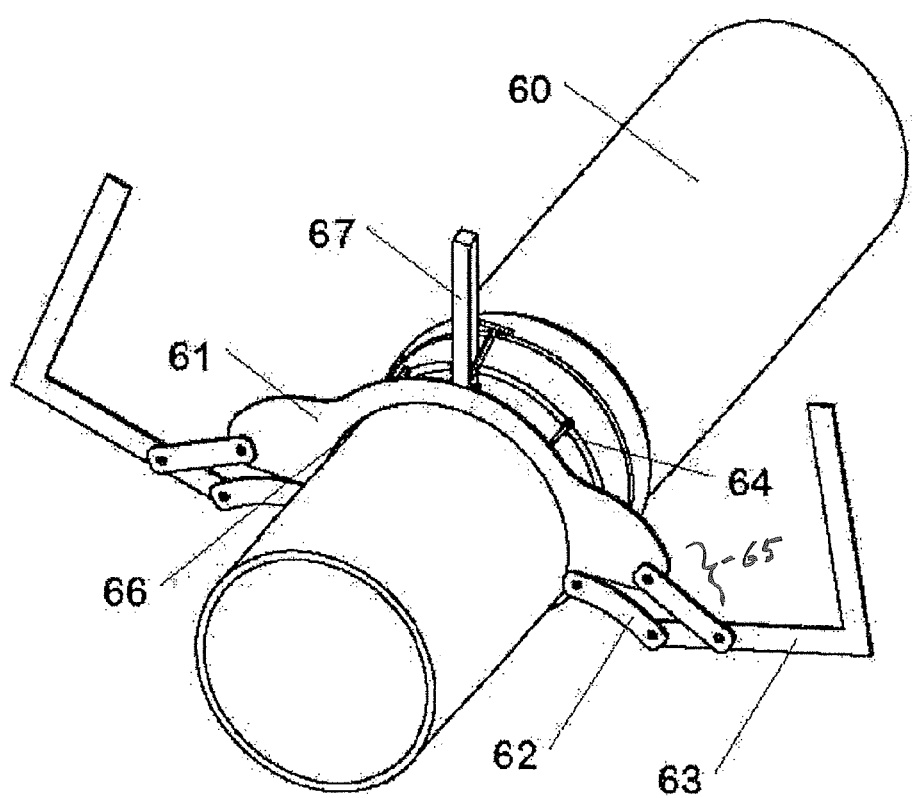
FIG. 6 is an isometric of the pipe brake fixture in the full open position.
Figure 7:
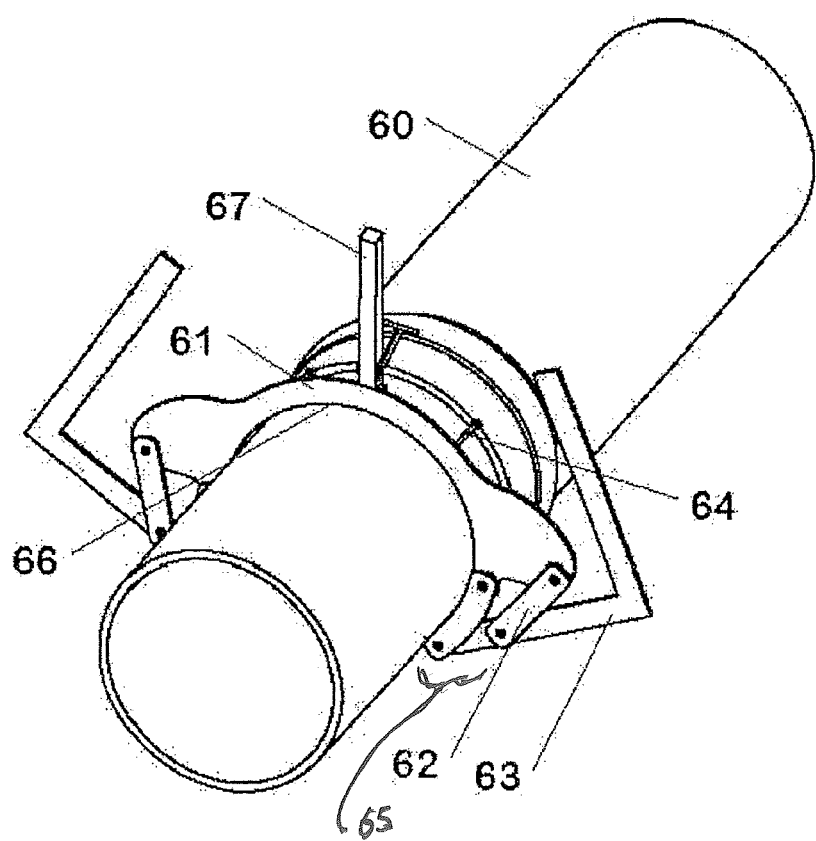
FIG. 7 is an isometric of the pipe brake fixture in the closed position.
Figure 8:
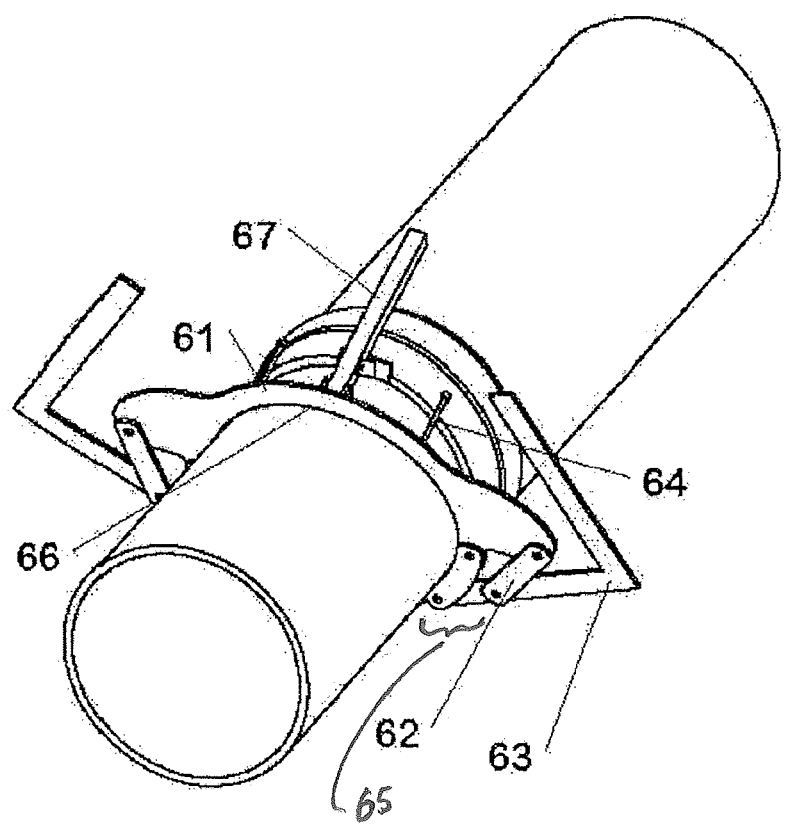
FIG. 8 is an isometric of the pipe brake fixture in the inclined position after being pressed to form an eccentric contact surface.
Figure 9:
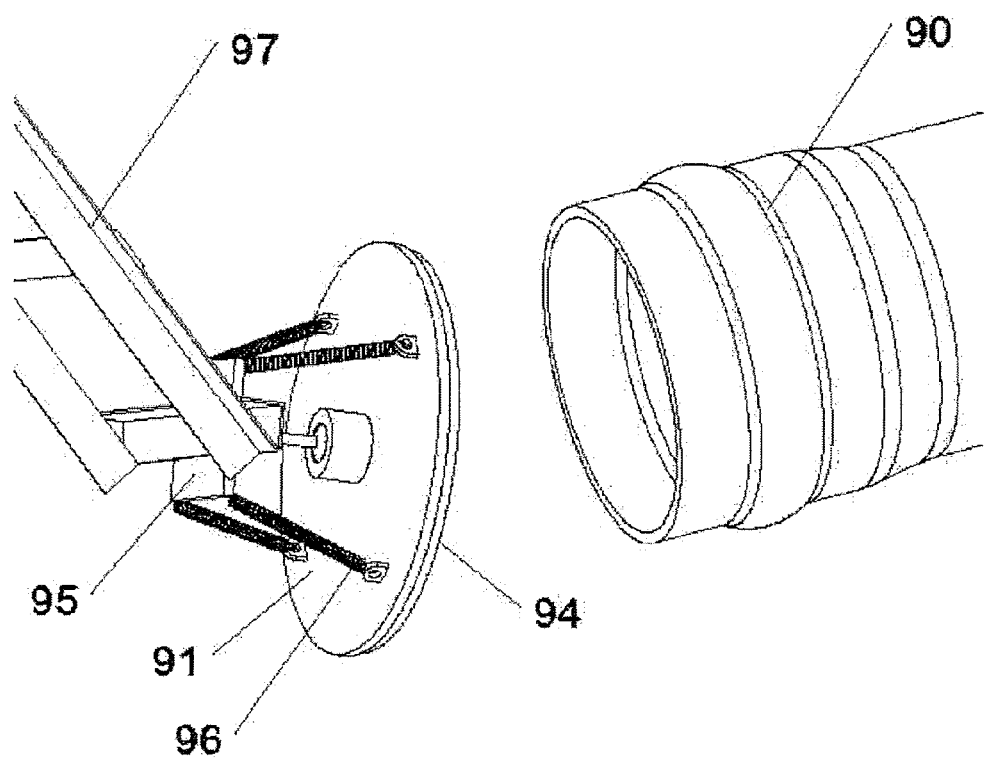
FIG. 9 is an isometric of the pipe plate fixture mounted to support framing and positioned for pipe contact.
Figure 10:
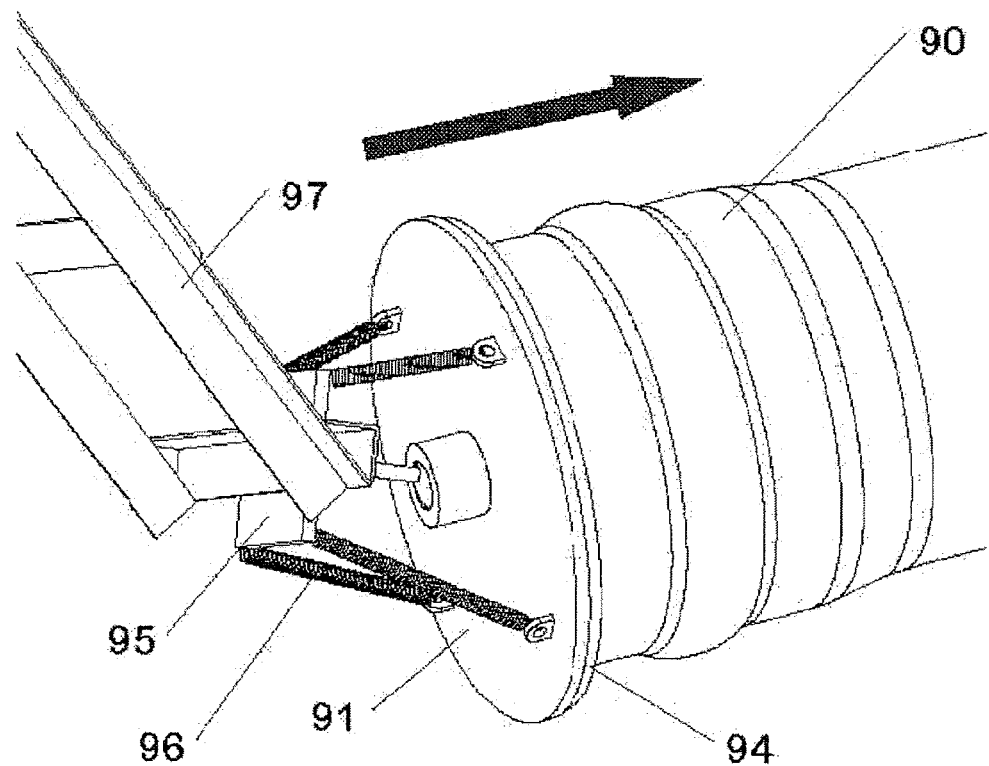
FIG. 10 is an isometric of the pipe plate fixture mounted to support framing and in full circumference contact with the pipe.
Figure 11:
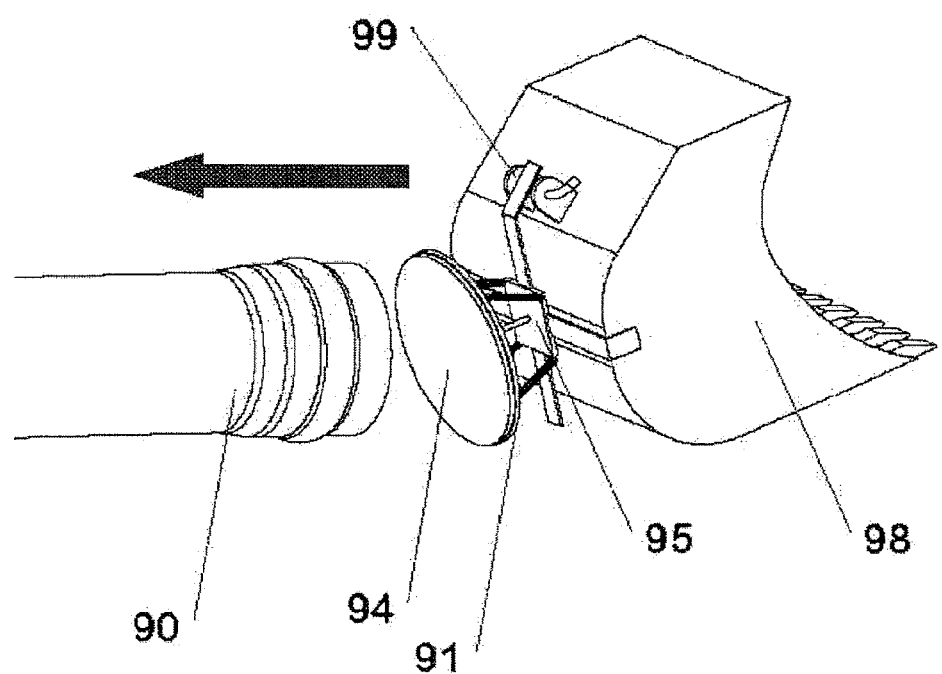
FIG. 11 is an isometric of the pipe plate fixture mounted to a backhoe bucket and positioned for pipe contact.
Figure 12:
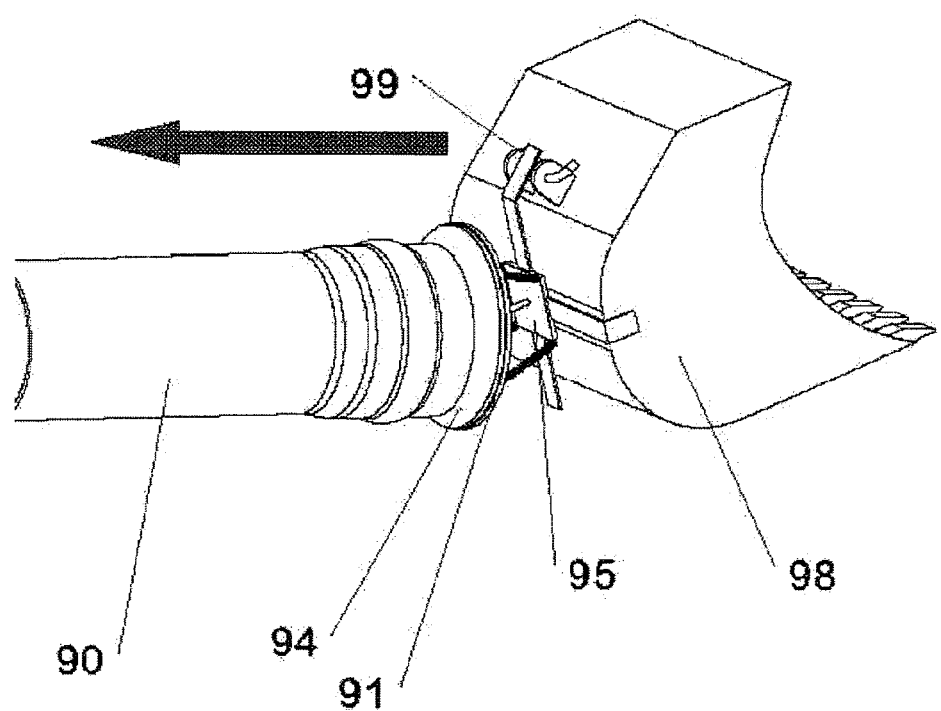
FIG. 12 is an isometric of the pipe plate fixture mounted to a backhoe bucket and in full circumference contact with the pipe.

Referring to FIGS. 6-8, a pipe brake fixture comprising a pipe 60, a yoke 61 removably disposed on the pipe 60, at least two articulating jaws 62 disposed on the yoke 61, at least two handles 63 disposed on the at least two jaws 62, a means for aligning 64 the fixture on the pipe 60, a means for locking 65 the at least two handles in position thereby forming a contact surface 66 between the fixture and the pipe, a means for pressing 67 the fixture along the pipe center axis direction thereby shifting the fixture into an inclined position and forming an eccentric shaped contact surface that increases the friction coefficient at the contact surface.

After belling is complete, the pipe brake fixture is used on the joint to brace the pipe joint, maintain mated final pipe positions and prevent over belling. When subsequent pipe sections downstream are installed, belling forces could be passed through the pipe and nudge a previously belled joint too far. The brake fixture is aligned at a fixed position from the pipe joint using threaded studs or other means. The fixture yoke straddles the pipe and handles are pulled together to hinge the jaws that grab the lower section of the pipe surface. A hinged stand then presses the fixture into an inclined or skewed position to tighten the grip on the pipe and hold the pipe position relative to the exposed end of the pipe bell.

Referring to FIGS. 9 through 12, a pipe plate fixture comprising a pipe 90, a disc body 91 having a front surface 92 and a back surface 93, a resilient disc 94 disposed on the body front surface 92, a mounting fixture 95 centrally disposed on the body back surface 93, at least two spring positioners 96 circumferentially disposed between the body back surface 93 and the mounting fixture 95 thereby allowing the disc body 91 to articulate around the mounting fixture 95 for equalized full perimeter contact between the resilient disc 94 and the pipe 90. The pipe plate fixture can be mounted to any suitable means for movement that can align the plate and apply full circumference pressure to the pipe. Support framing 97 mounted to a backhoe arm with hydraulically controlled motion can be used for movement and positioning the fixture. The fixture can also be removably mounted to a backhoe bucket 98 using a means for securing 99 the mounting fixture to the bucket.

The pipe plate fixture is used by a backhoe or other suitable construction equipment to apply full circumference pressure to a pipe end during belling.

Figure 13:
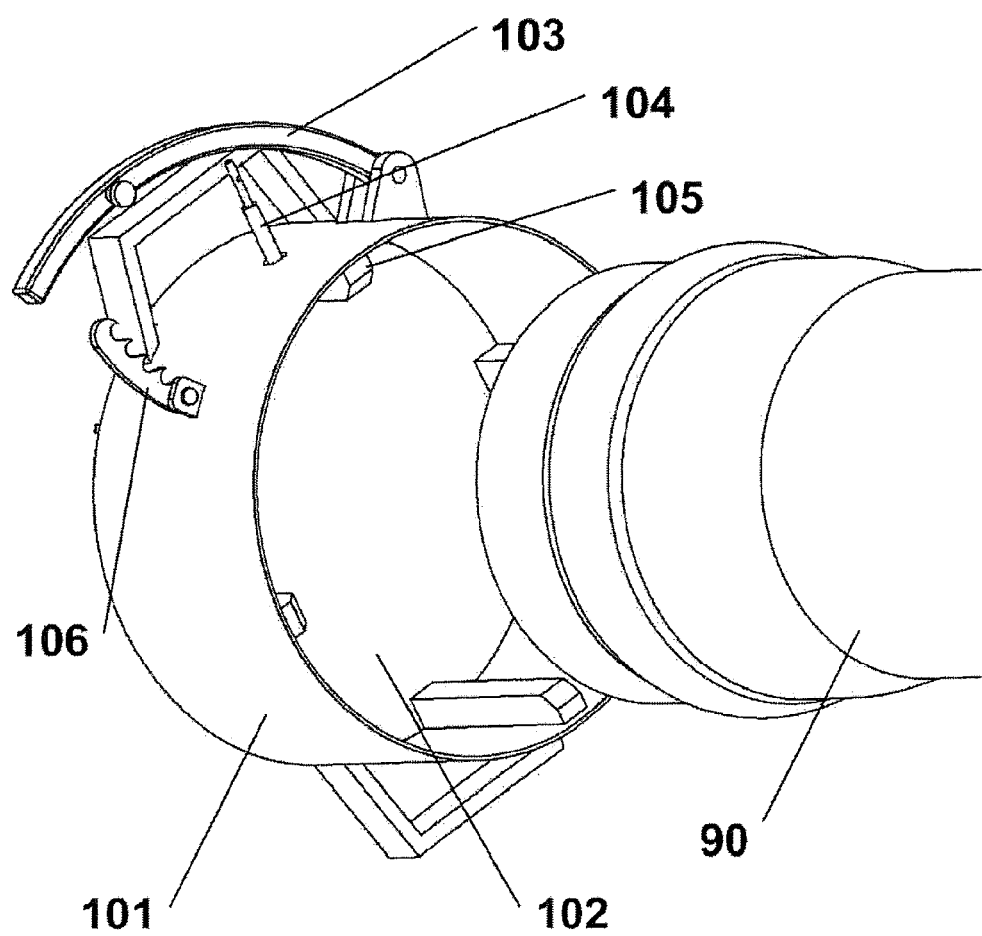
FIGS. 13 & 14 are installation isometrics of the compressive rib bell boss suitable for low pressure applications.
Figure 14:
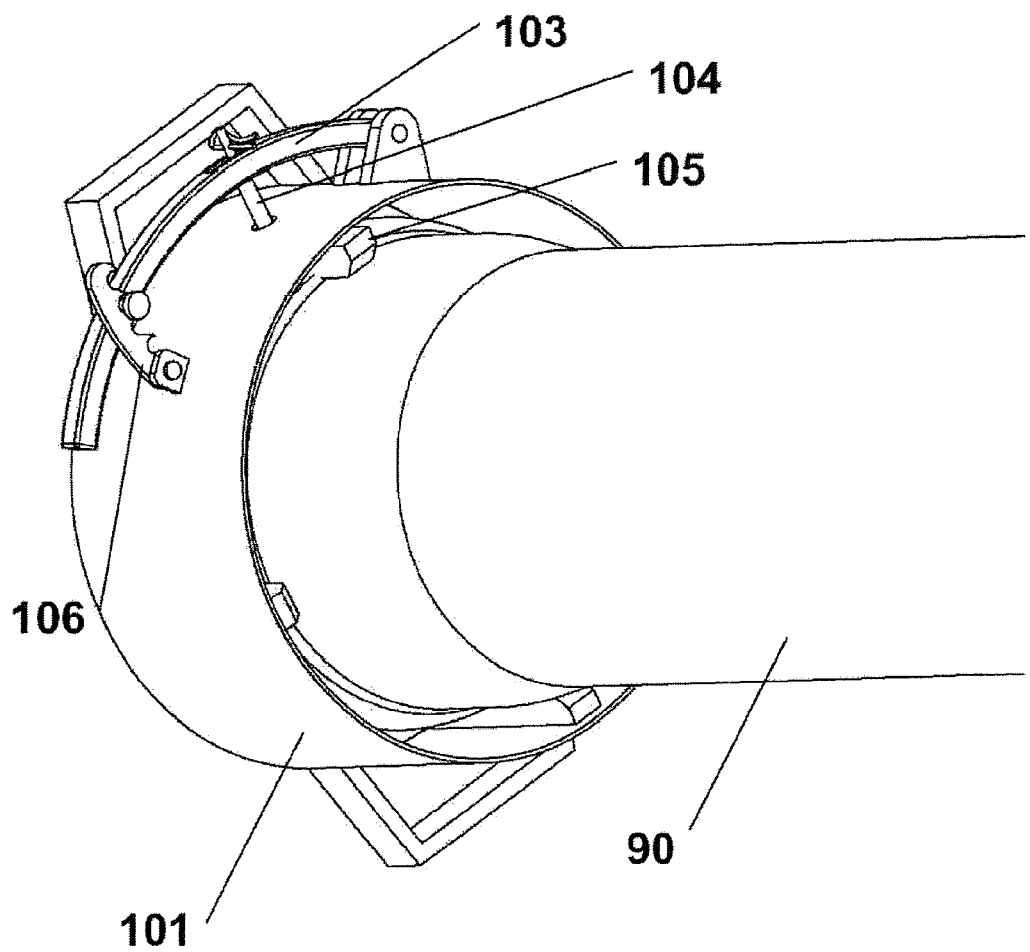
Figure 15:
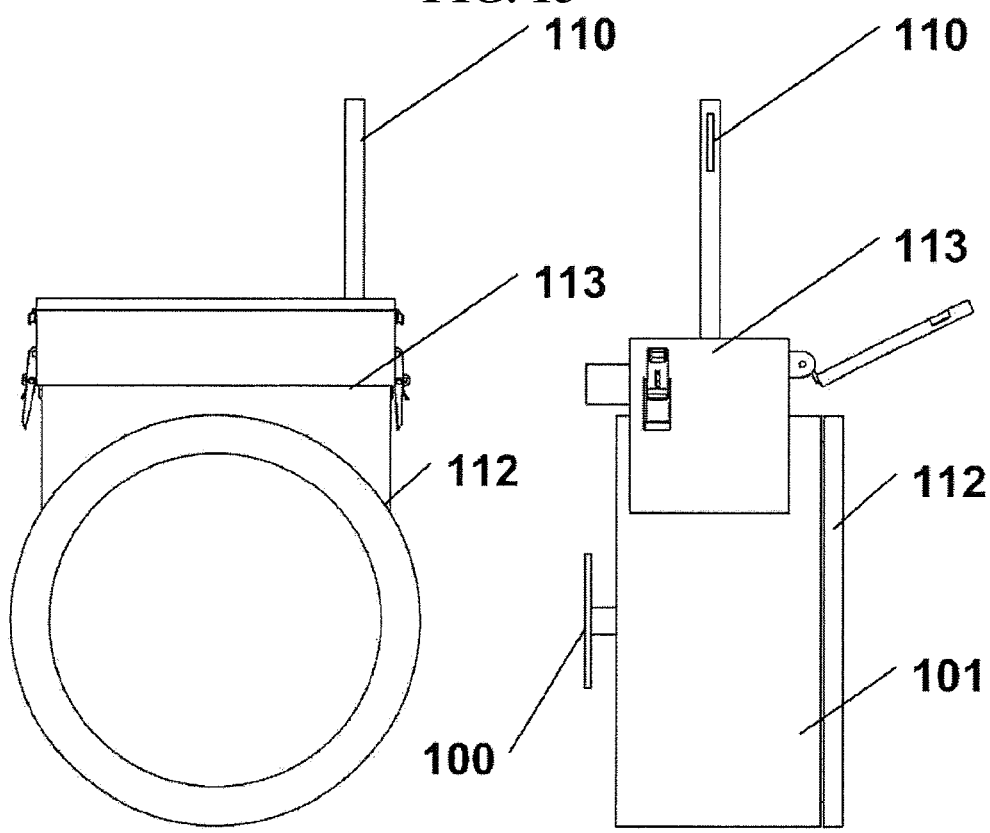
FIG. 15 thru 20 are installation isometrics of the secure locking band bell boss suitable for medium pressure applications.
Figure 15:
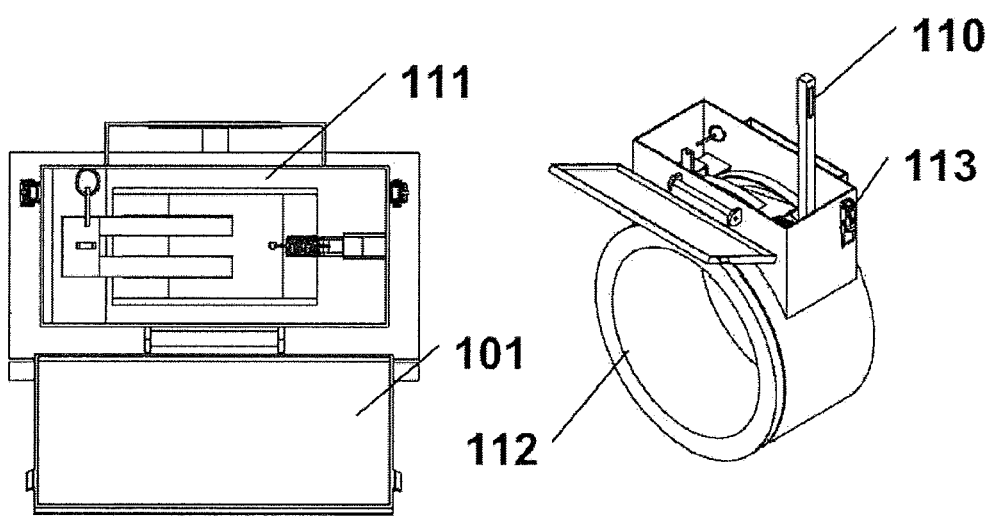
Figure 16:
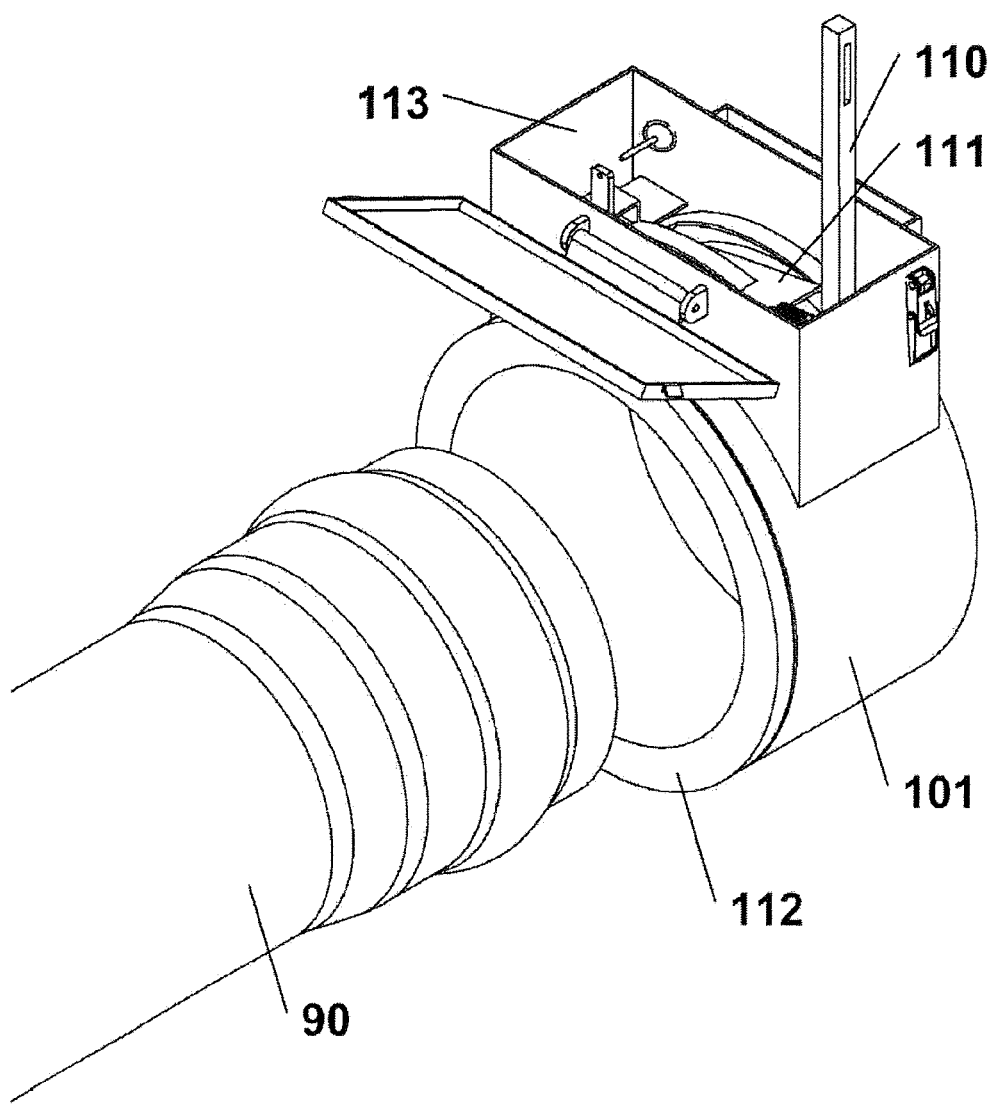
Figure 17:
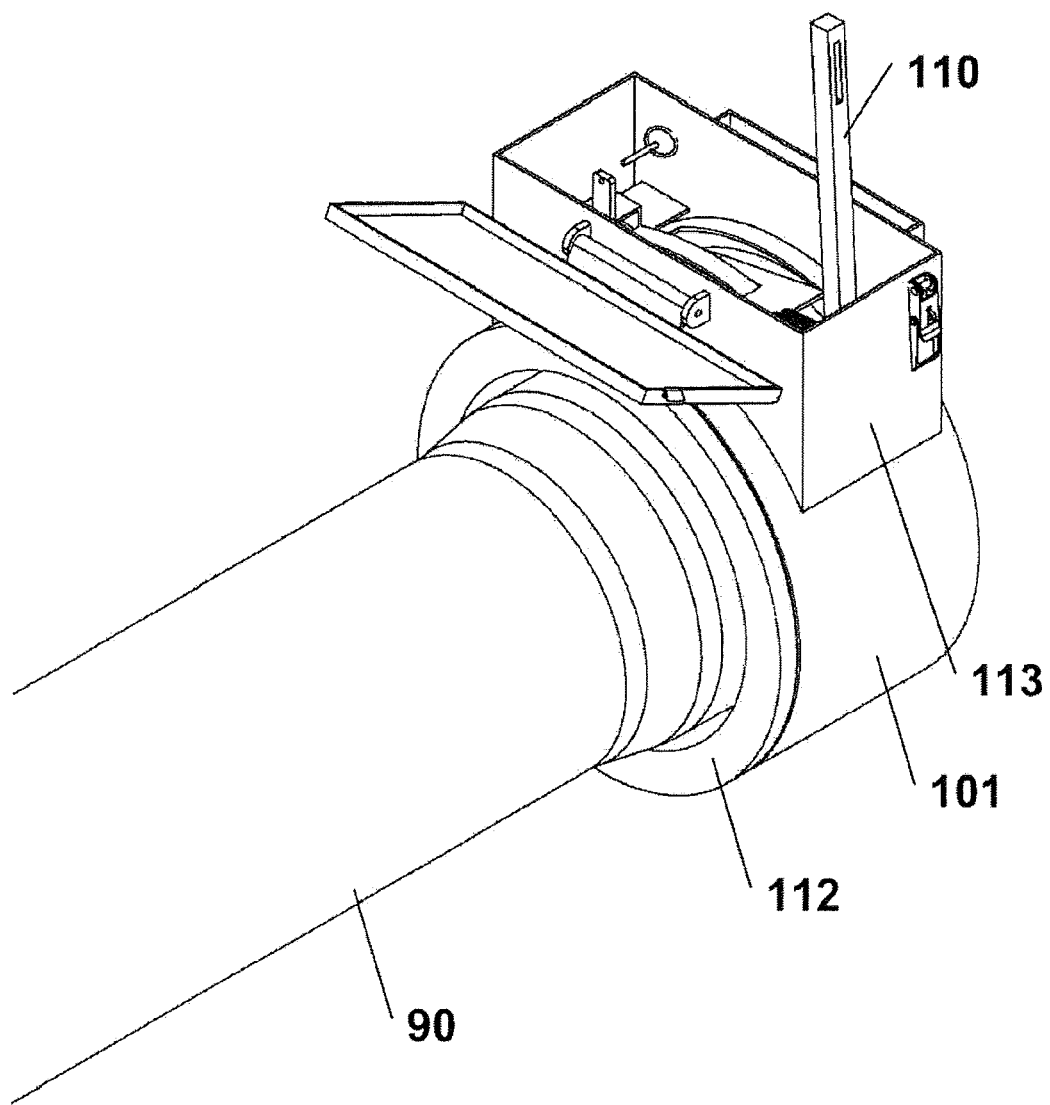
Figure 18:
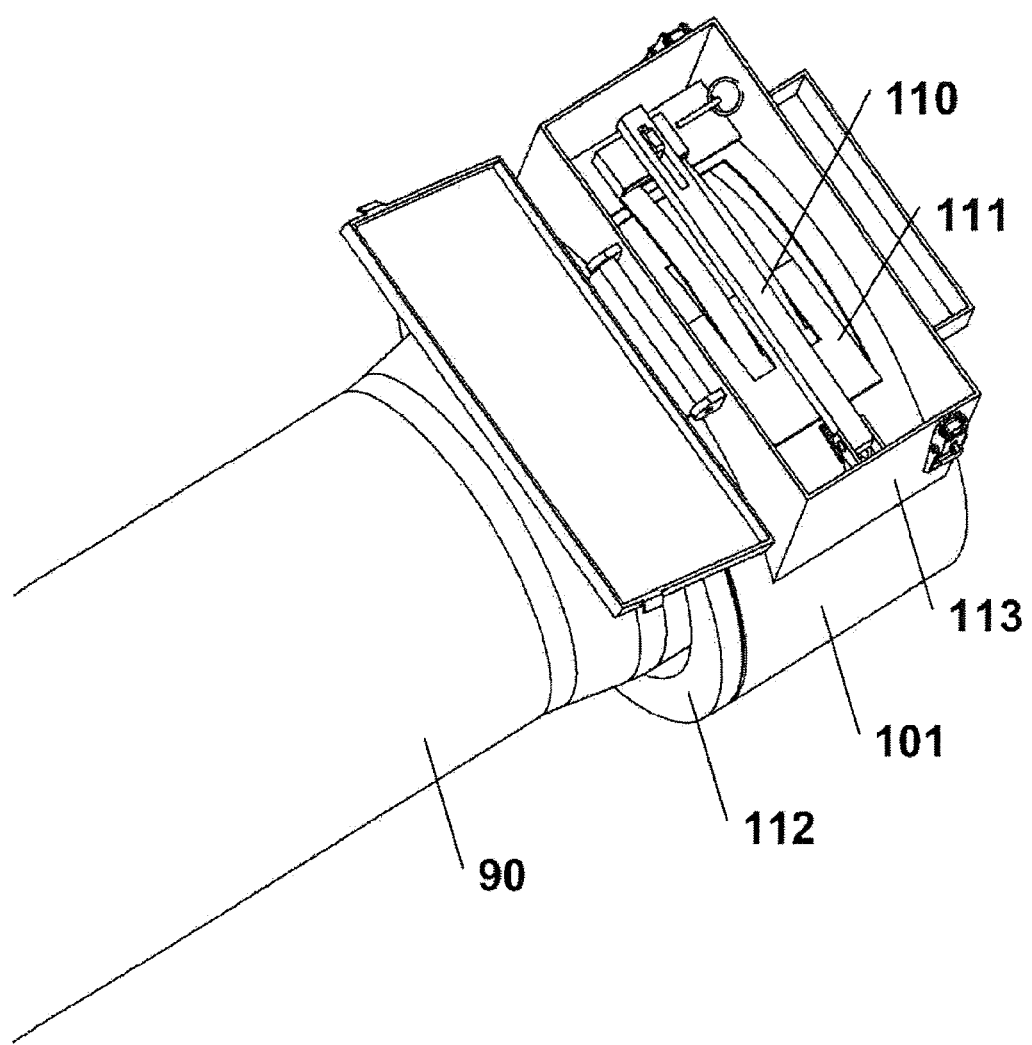
Figure 19:
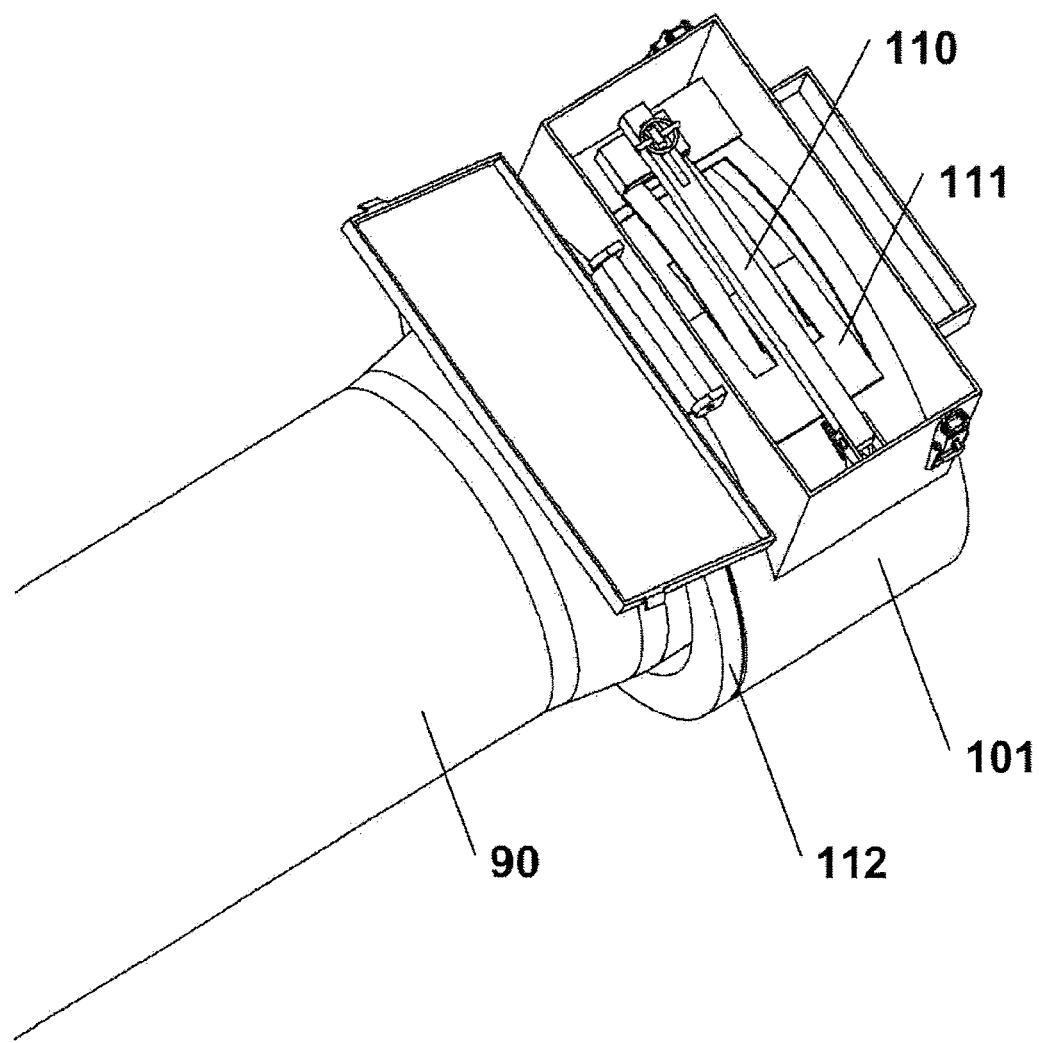
Figure 20:
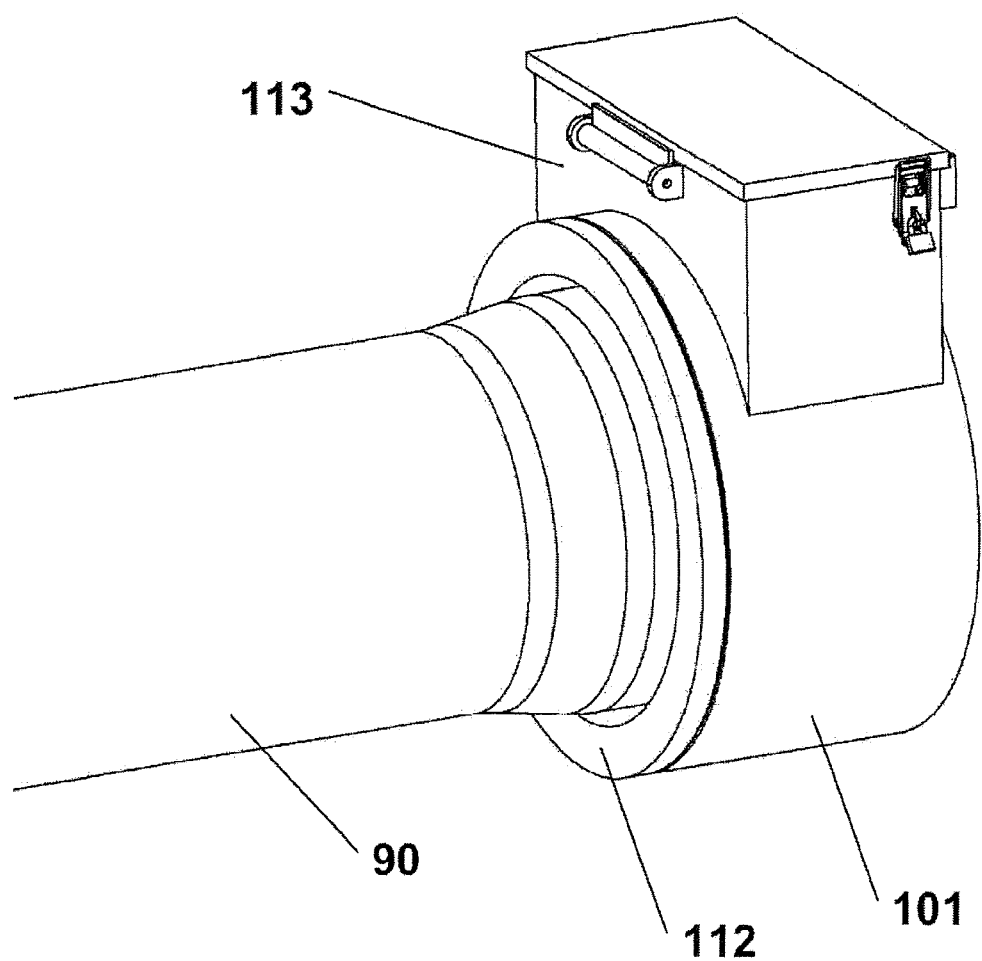
Figure 21:
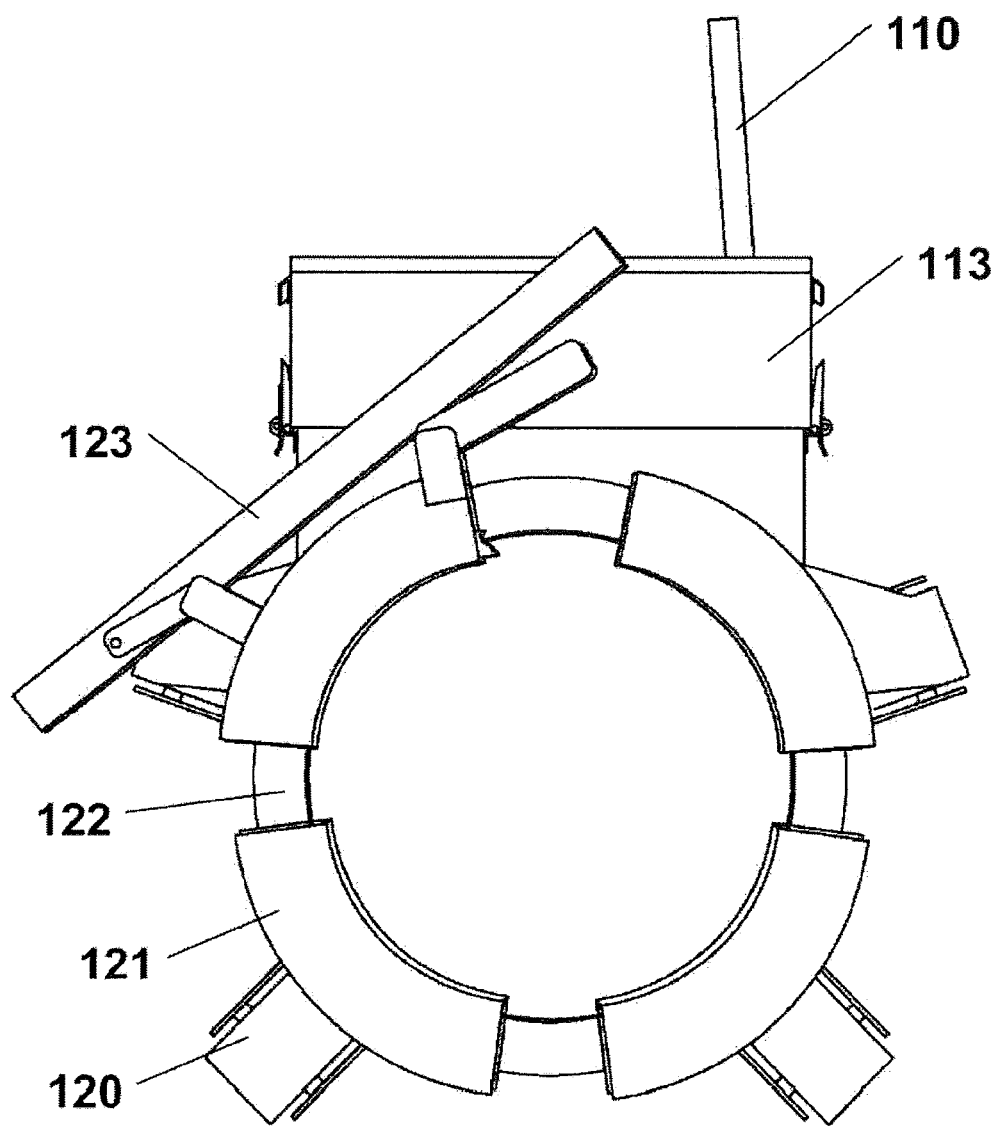
FIG. 21 thru 30 are installation isometrics of the secure locking band with segmented grip arms tightly secured to an upstream portion of the pipe using a ratchet band; suitable for high pressure applications.
Figure 22:
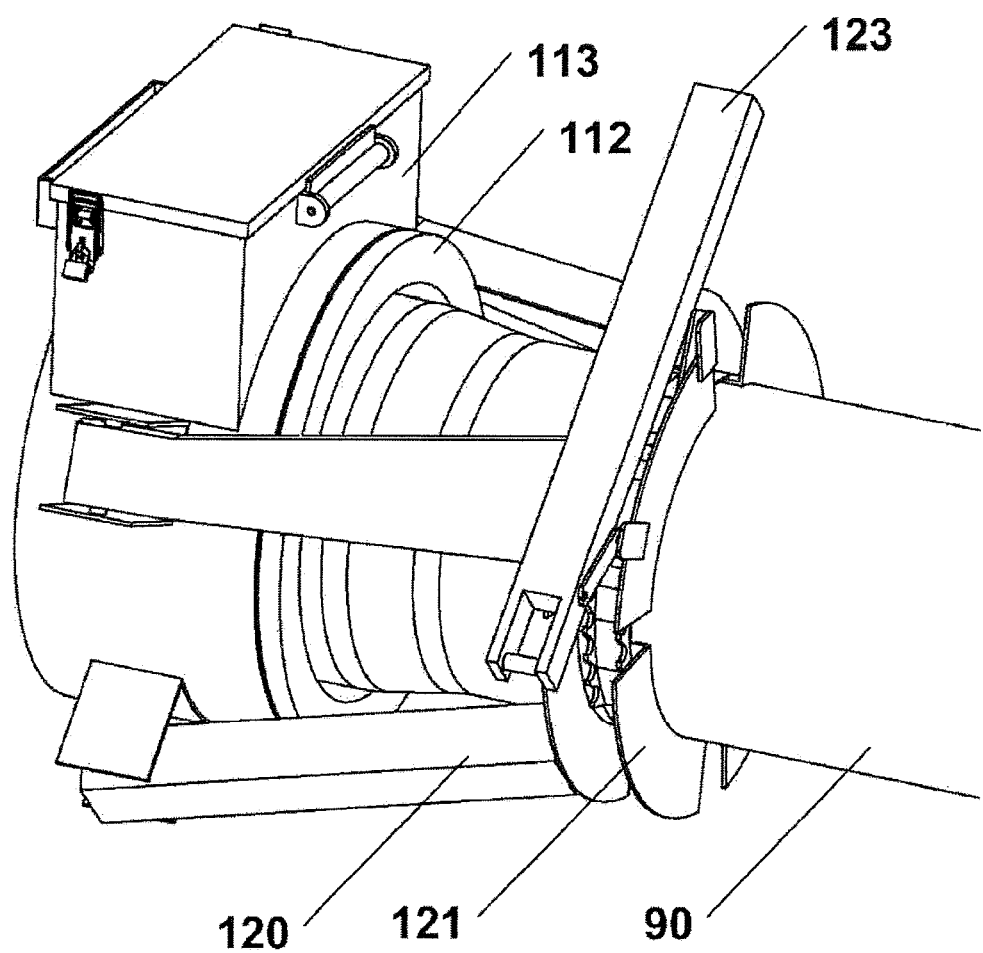
Figure 23:
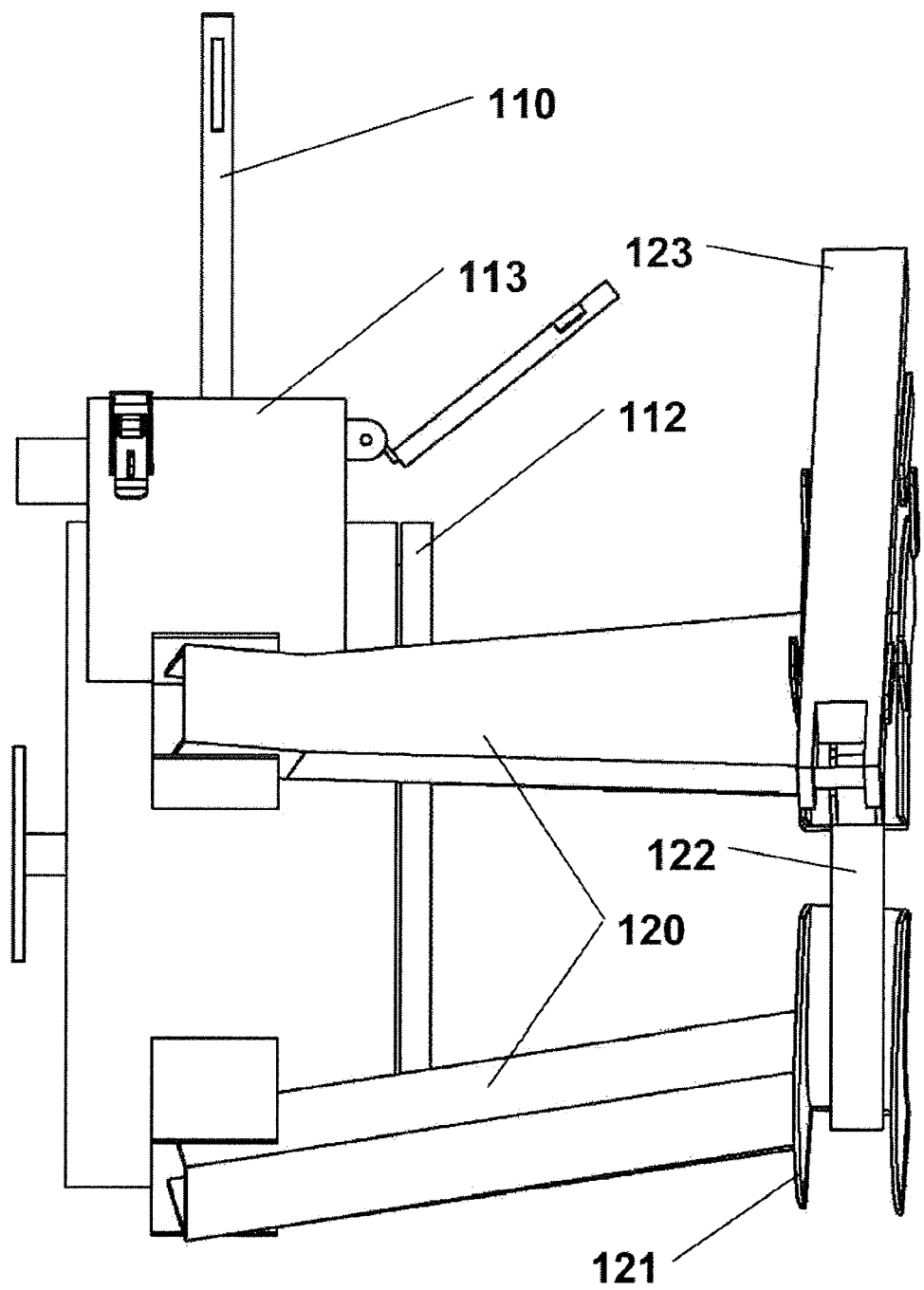
Figure 24:
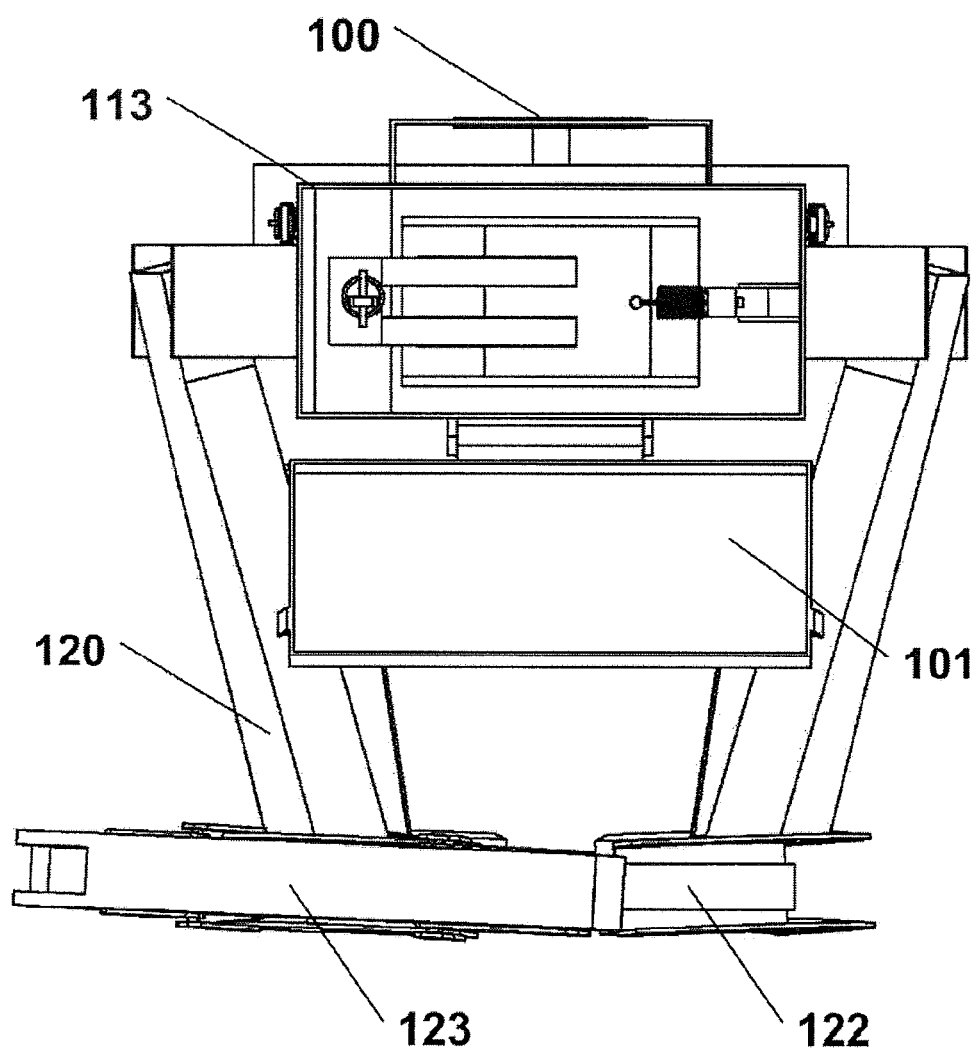
Figure 25:
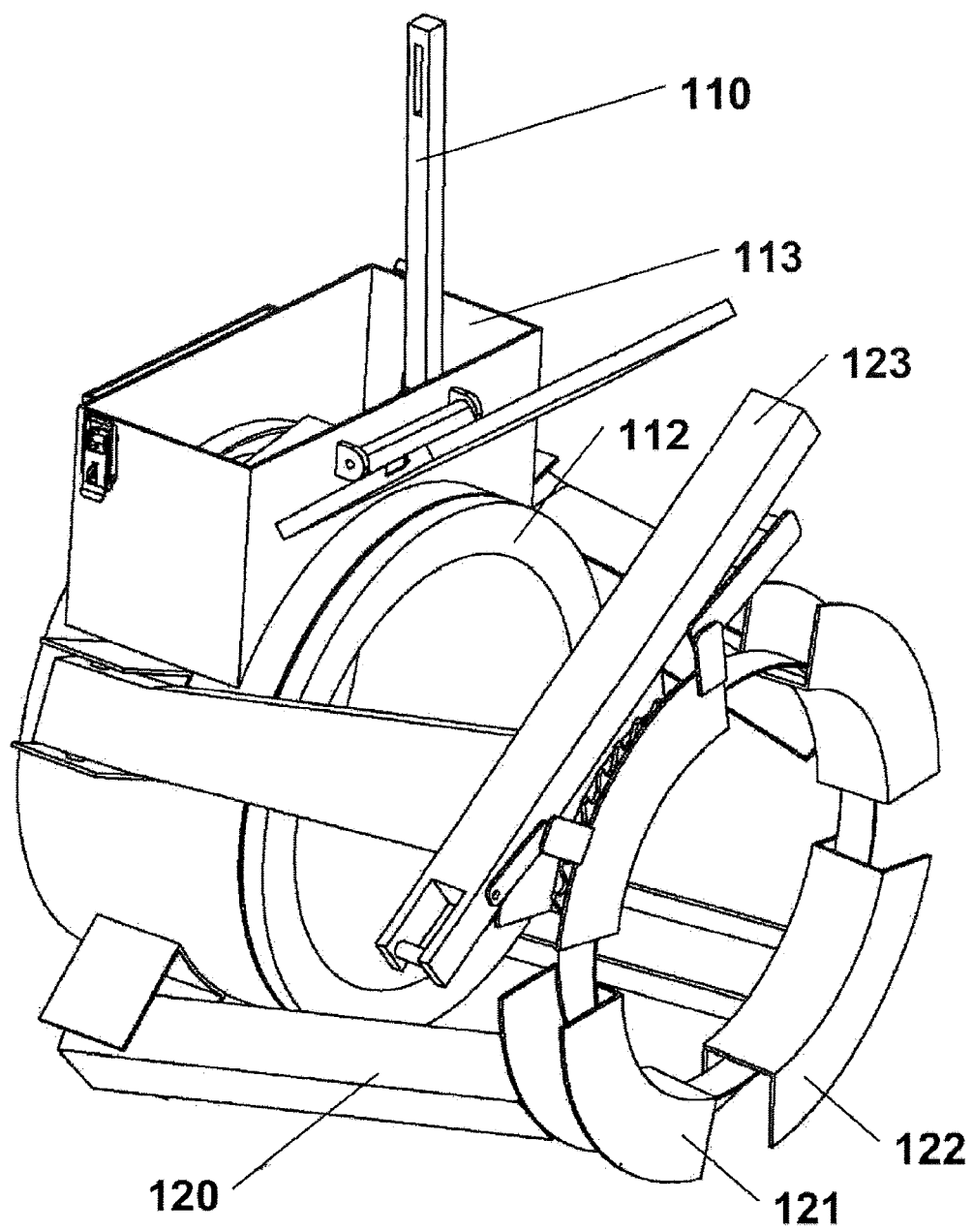
Figure 26:
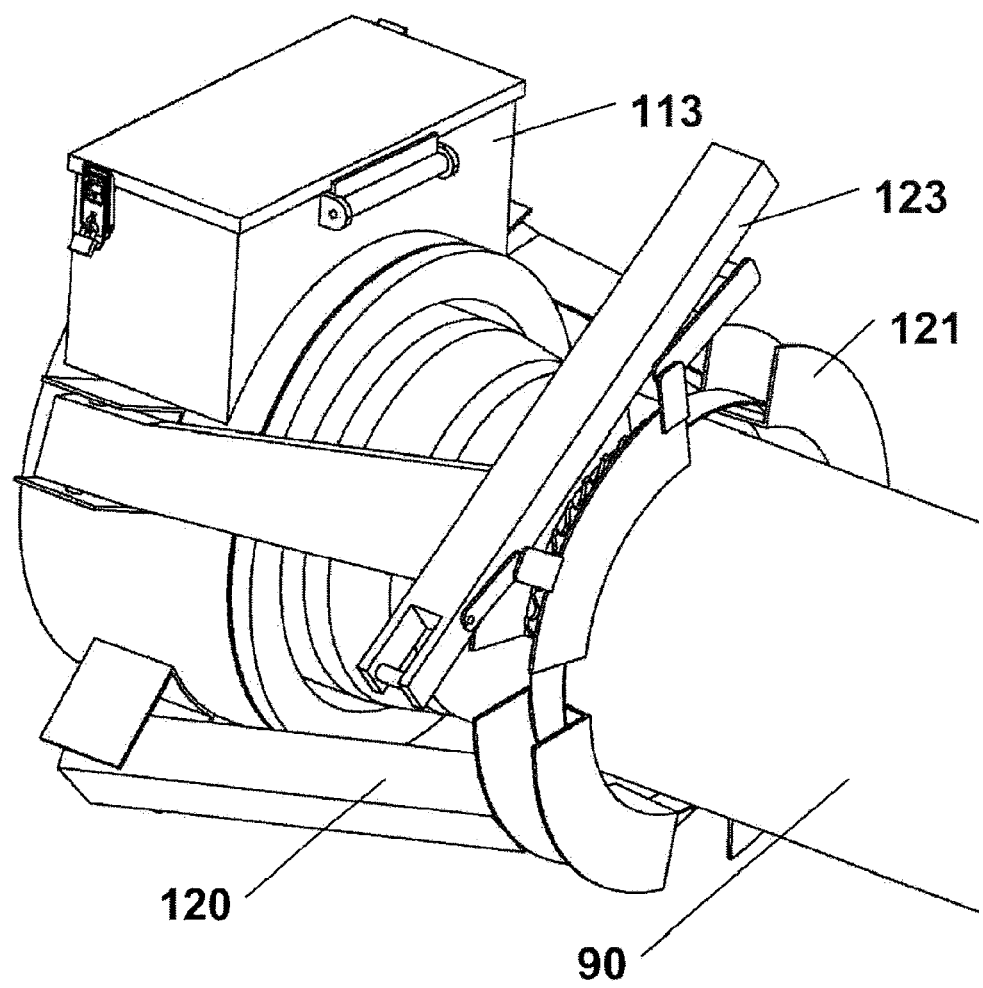
Figure 27:
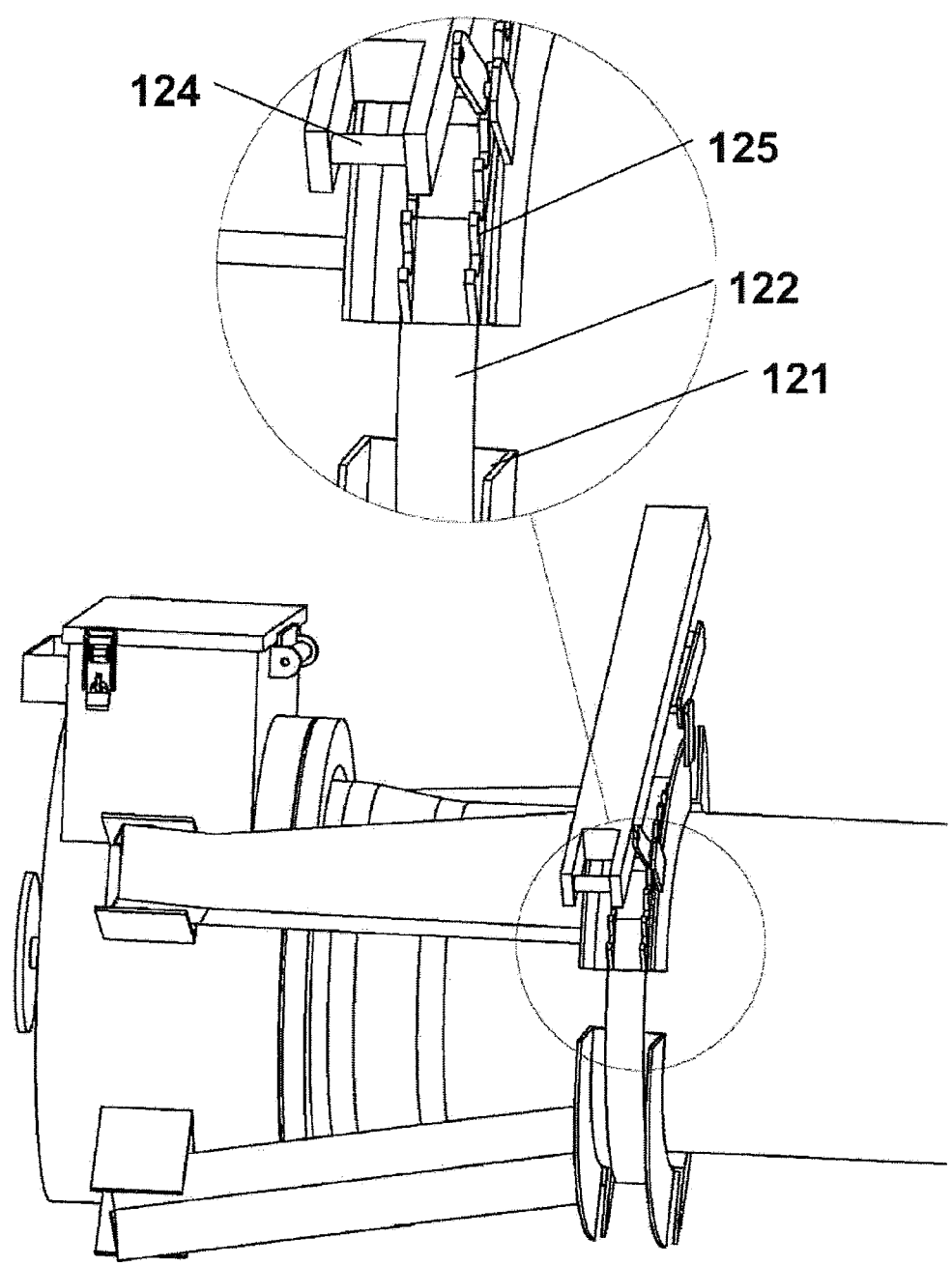
Figure 28:
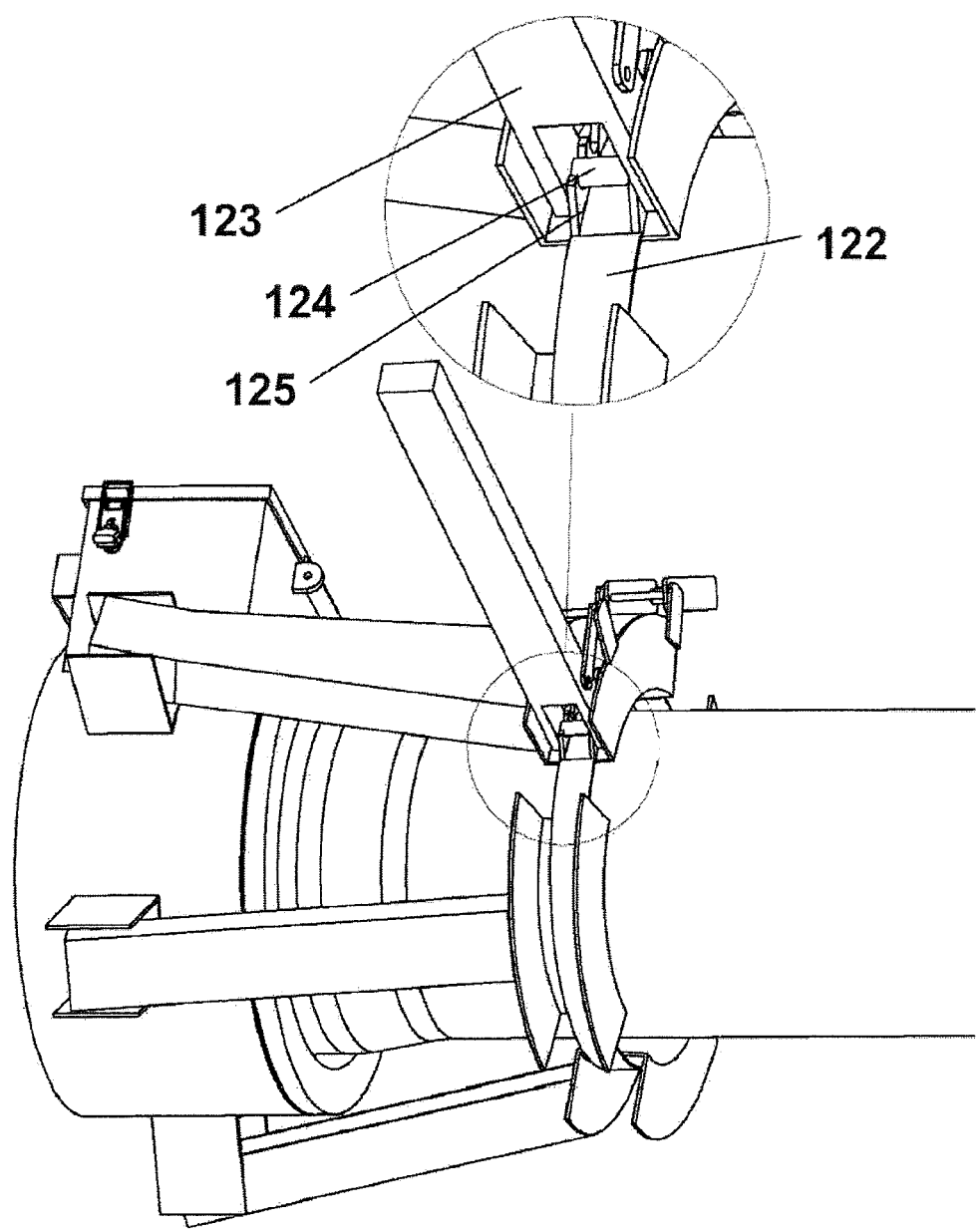
Figure 29:
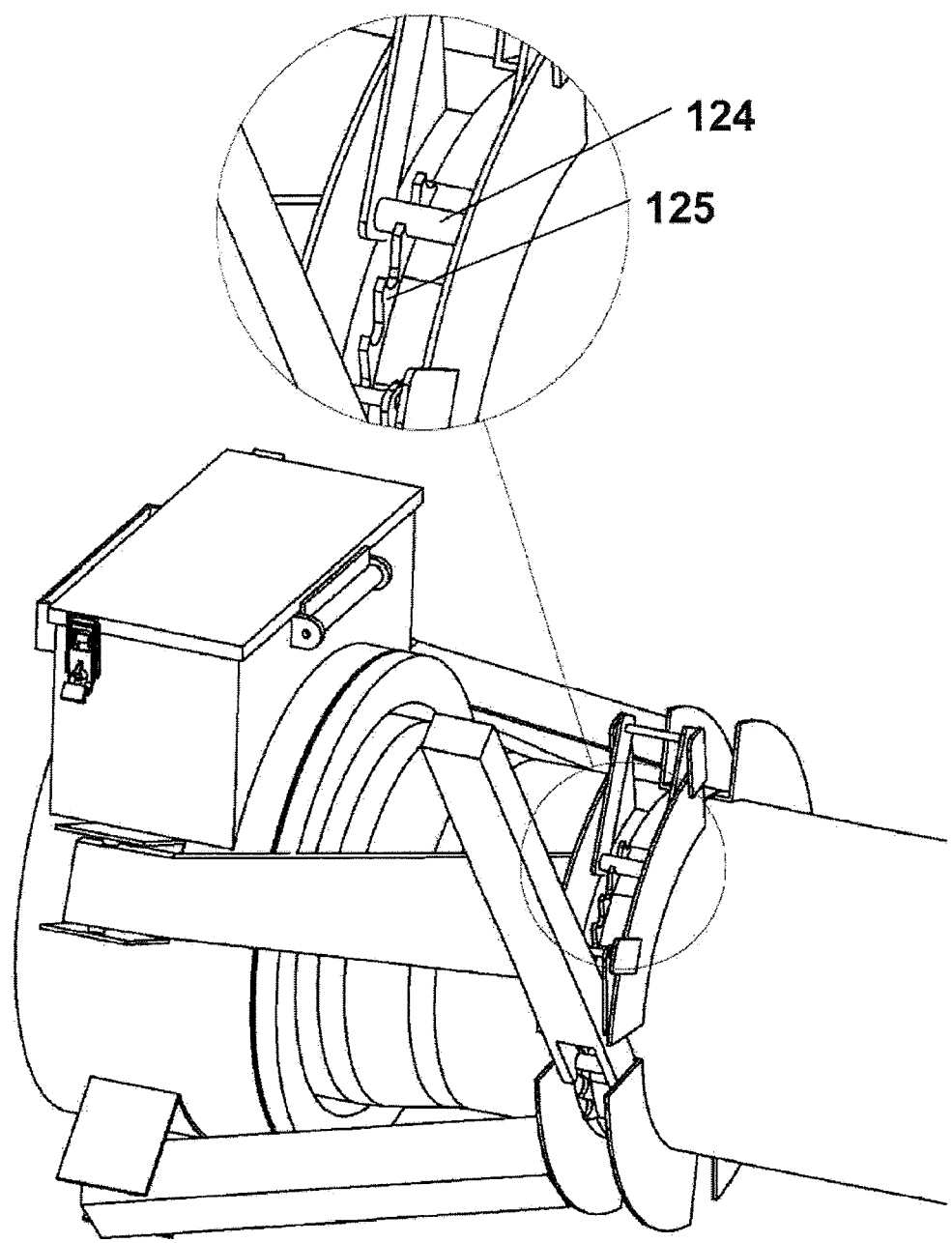
Figure 30:
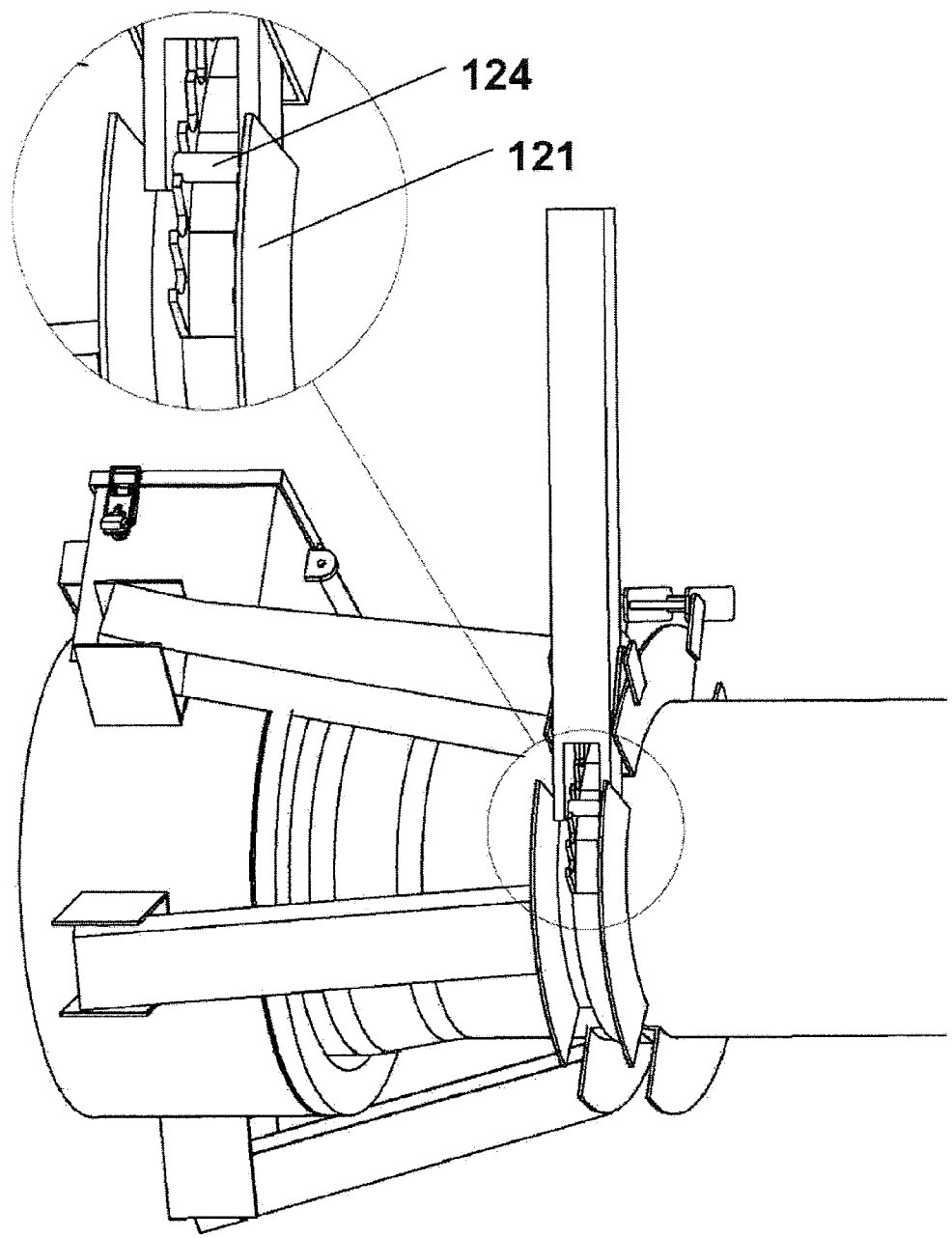

Referring to FIGS. 13 and 14, the compressive rib embodiment of the fixture is installed onto a pipe (90). The cylindrical body (101) has a resilient insert (102) disposed on the closed end portion of the cylindrical body (101) inside surface. At least one resilient rib (105) is disposed on the cylindrical body (101) inside surface and adjacent the pipe. A striker projection (not shown) is located on the closed end outer surface of the fixture. At least one post (104) is disposed adjacent at least one resilient rib (105). The post is positioned essentially perpendicular to and through the cylindrical body (101) and capable of bidirectional motion. A hinged locking arm (103) is disposed onto the cylindrical body (101) outside surface and positioned to engage and move the post during locking motion thereby deforming the resilient rib (105) and squeezing it tightly against the pipe (90). The hinged locking arm (103) is locked into position using a notched latch (106).

Referring to FIGS. 15 through 20, the secure locking band embodiment of the fixture is installed onto a pipe (90). The cylindrical body (101) has a resilient insert (102) disposed on the closed end portion of the cylindrical body (101) inside surface. At least one resilient rib (105) is disposed on the cylindrical body (101) inside surface and adjacent the pipe. A striker projection (100) is located on the closed end outer surface of the fixture. The fixture has a locking clamp (110) mounted on the cylindrical body (101) outside surface. At least one compression band (111) is coupled to the locking clamp (110). The compression band (111) extends through the cylindrical body (101). A portion of the compression band (111) is positioned between the cylindrical body (101) inside surface and the resilient insert (112) which allows the compression band (111) to cinch the resilient insert (112) to the pipe (90). Optionally, sealant can be added for sealing the resilient insert (112) to the pipe (90). A locking security cover (113) is mounted on the cylindrical body (101) outside surface and at least partially encloses the locking clamp (110). The locking security cover (113) prevents tampering with the fixture once it is mounted to the pipe.

Referring to FIGS. 21 through 30, the segmented grip arm embodiment of the fixture is installed onto a pipe (90). This embodiment adds to the secure locking band embodiment of the fixture. The cylindrical body (101) has a resilient insert (102) disposed on the closed end portion of the cylindrical body (101) inside surface. At least one resilient rib (105) is disposed on the cylindrical body (101) inside surface and adjacent the pipe. A striker projection (100) is located on the closed end outer surface of the fixture. The fixture has a locking clamp (110) mounted on the cylindrical body (101) outside surface. At least one compression band (111) is coupled to the locking clamp (110). The compression band (111) extends through the cylindrical body (101). A portion of the compression band (111) is positioned between the cylindrical body (101) inside surface and the resilient insert (112) which allows the compression band (111) to cinch the resilient insert (112) to the pipe (90). Optionally, sealant can be added for sealing the resilient insert (112) to the pipe (90). A locking security cover (113) is mounted on the cylindrical body (101) outside surface and at least partially encloses the locking clamp (110). The locking security cover (113) prevents tampering with the fixture once it is mounted to the pipe. Additionally, the fixture has at least one segmented grip arm (120) mounted to the cylindrical body (101) outside surface. At least one grip arc (121) is mounted to the upstream end of each grip arm (120). At least one annular ratchet band (122) is routed through a set of grip arcs (121). At least one folding ratchet arm (123) is mounted to the annular ratchet band (122). The folding ratchet arm (123) further has a ratchet stop (124) to engage with ratchet teeth (125) and fold to a closed position thereby securely cinching the grip arcs (121) to the pipe (90) upstream of the cylindrical body (101).

Figure 31:
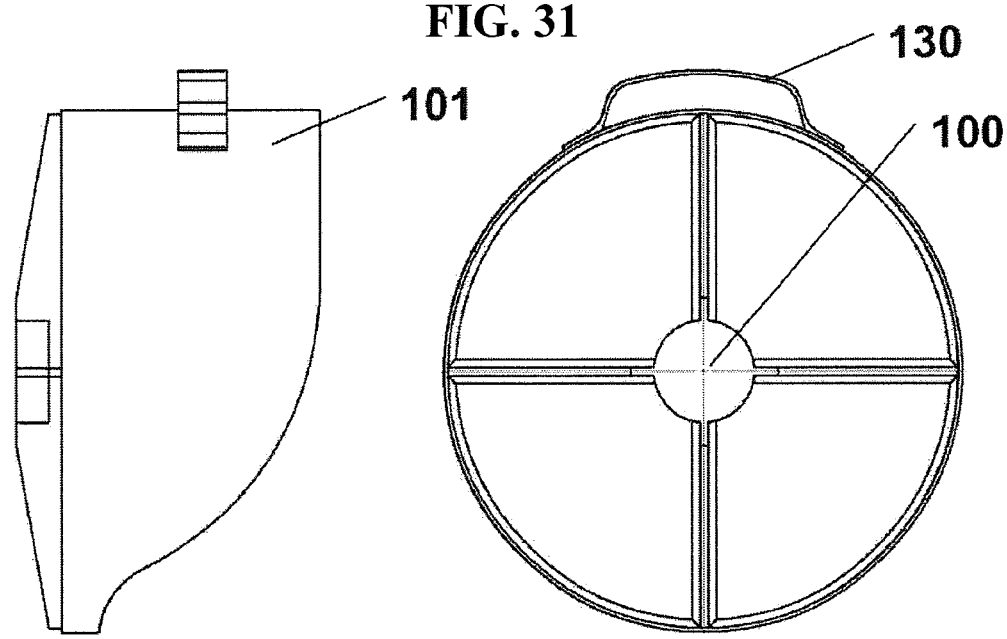
FIG. 31 thru 33 are installation isometrics of the resting bell boss suitable for temporary capping of pipe ends.
Figure 31:
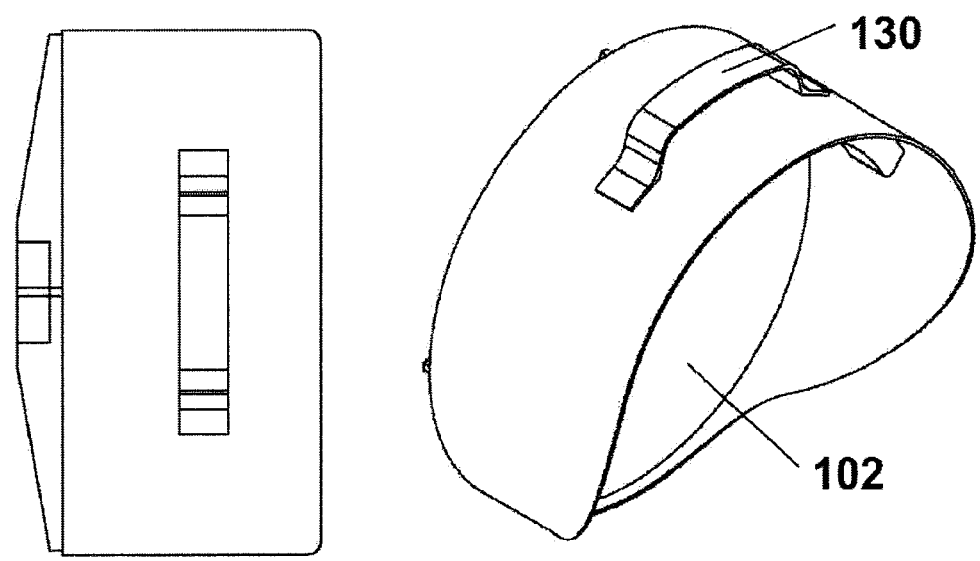
Figure 32:
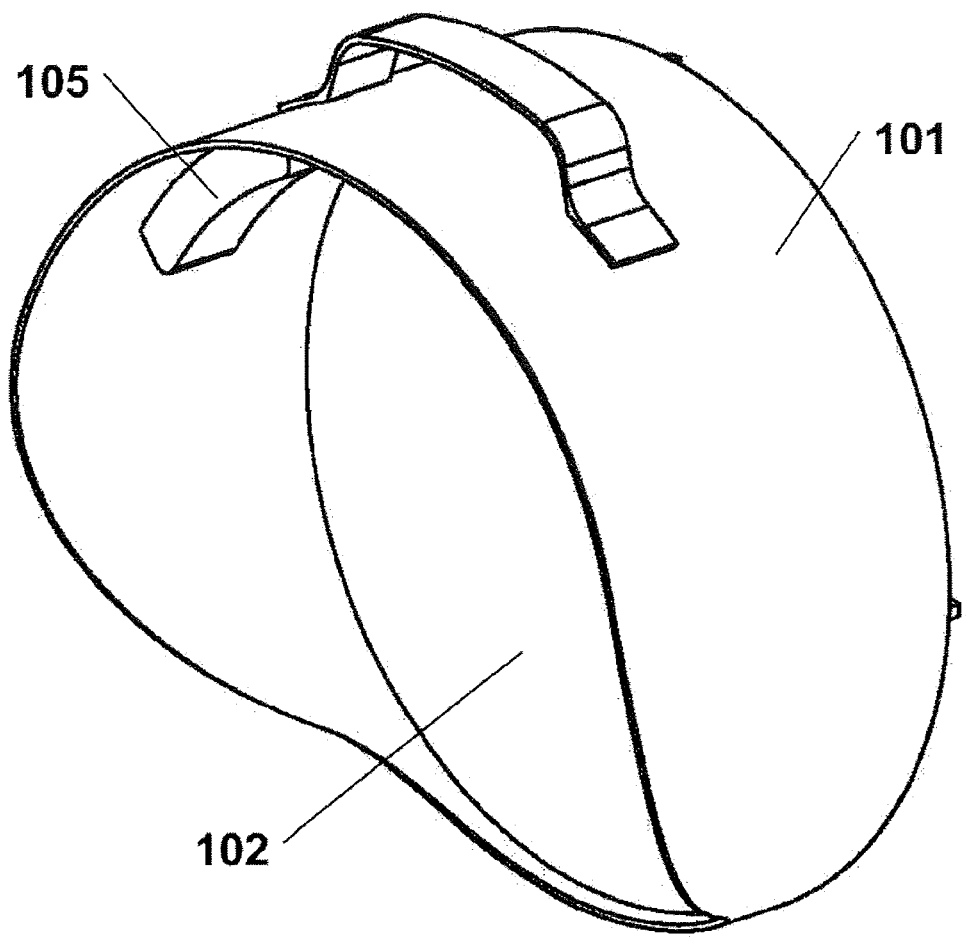
Figure 33:
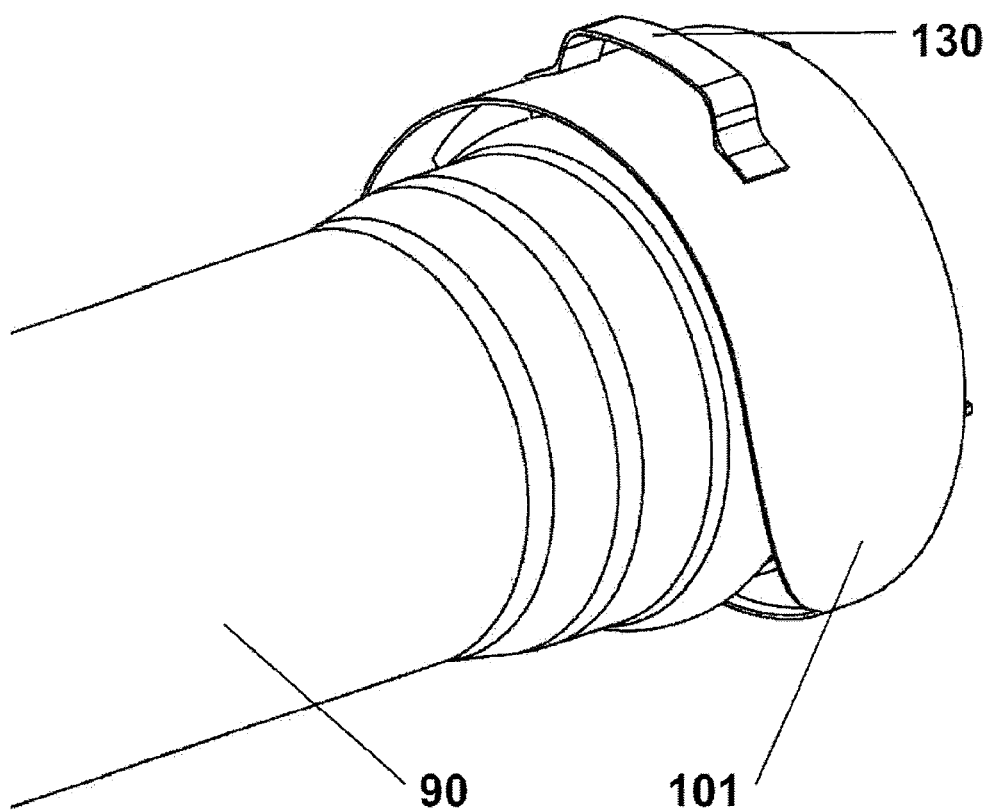
Figure 34:
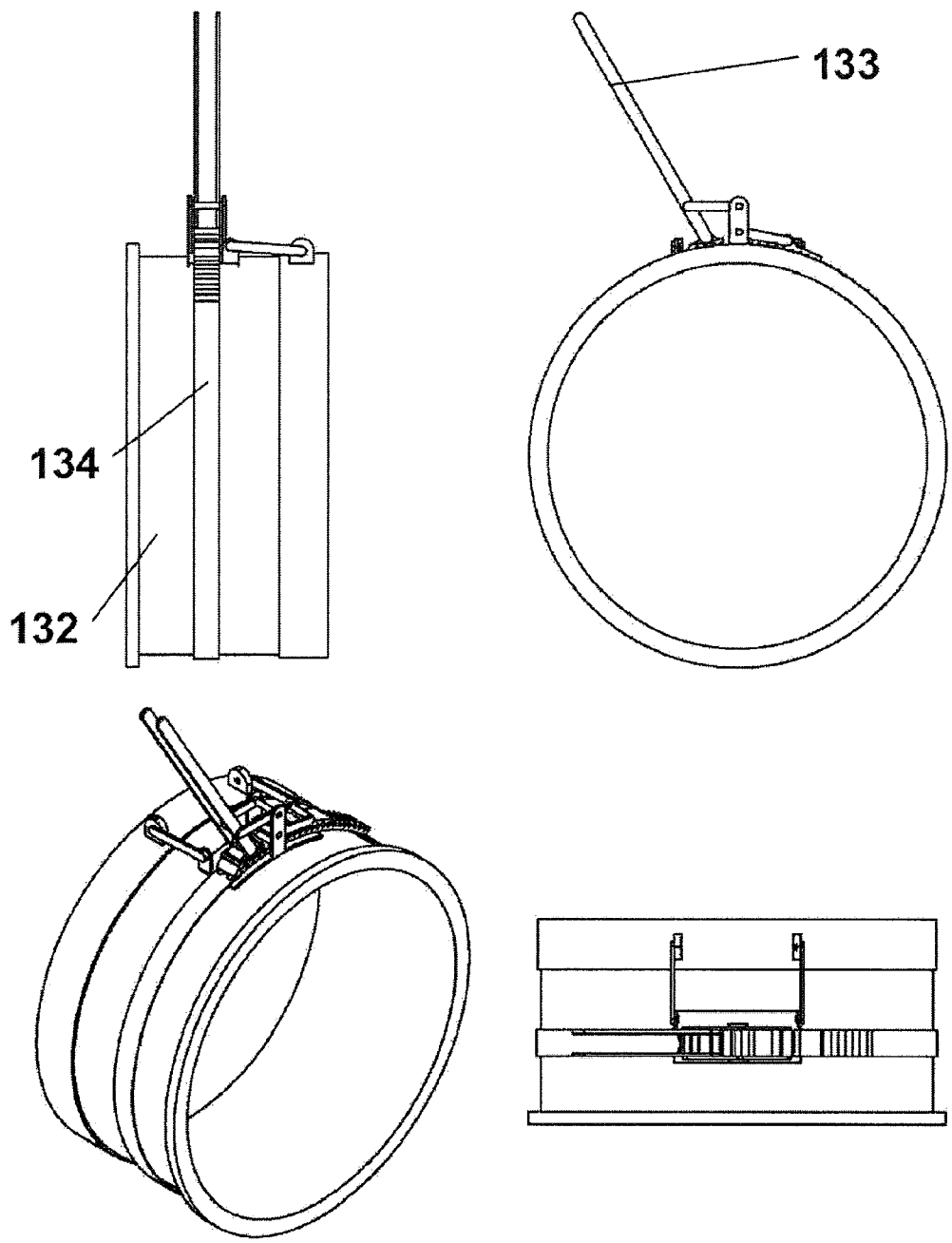
FIG. 34-39 are installation isometrics of the resilient bucket with a protective end cap ratchet banded around the resilient bucket suitable for low to medium pressure applications.
Figure 35:
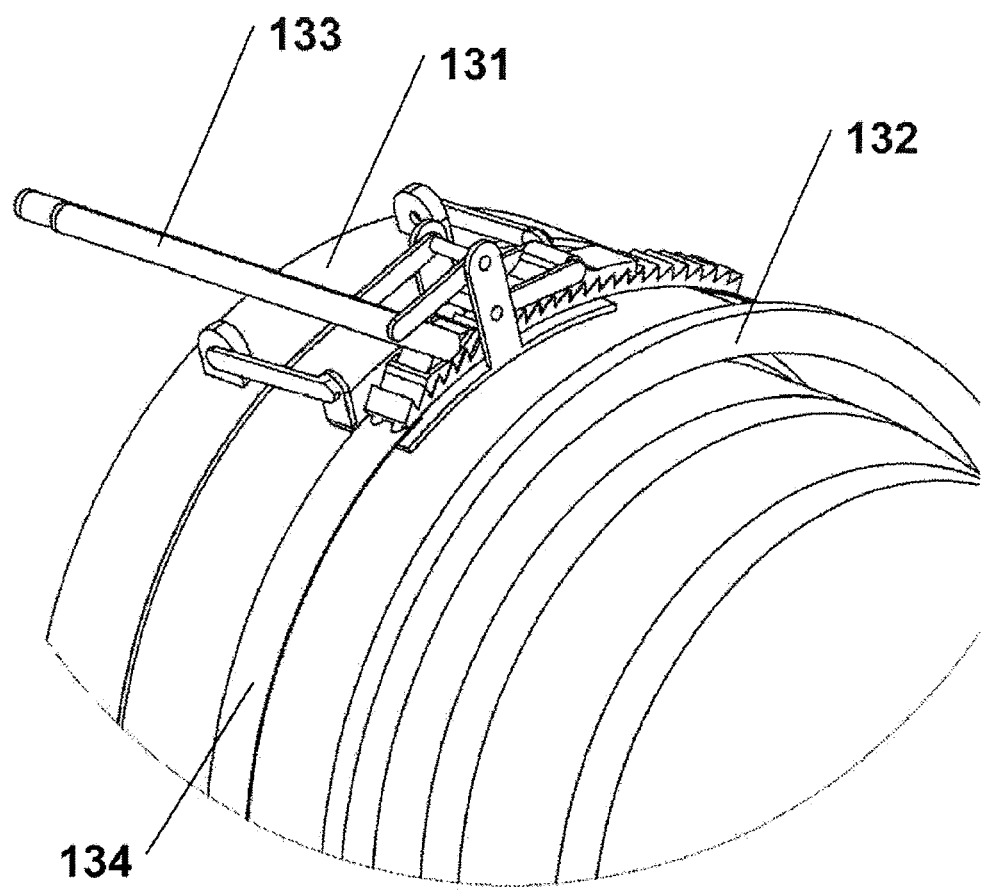
Figure 36:
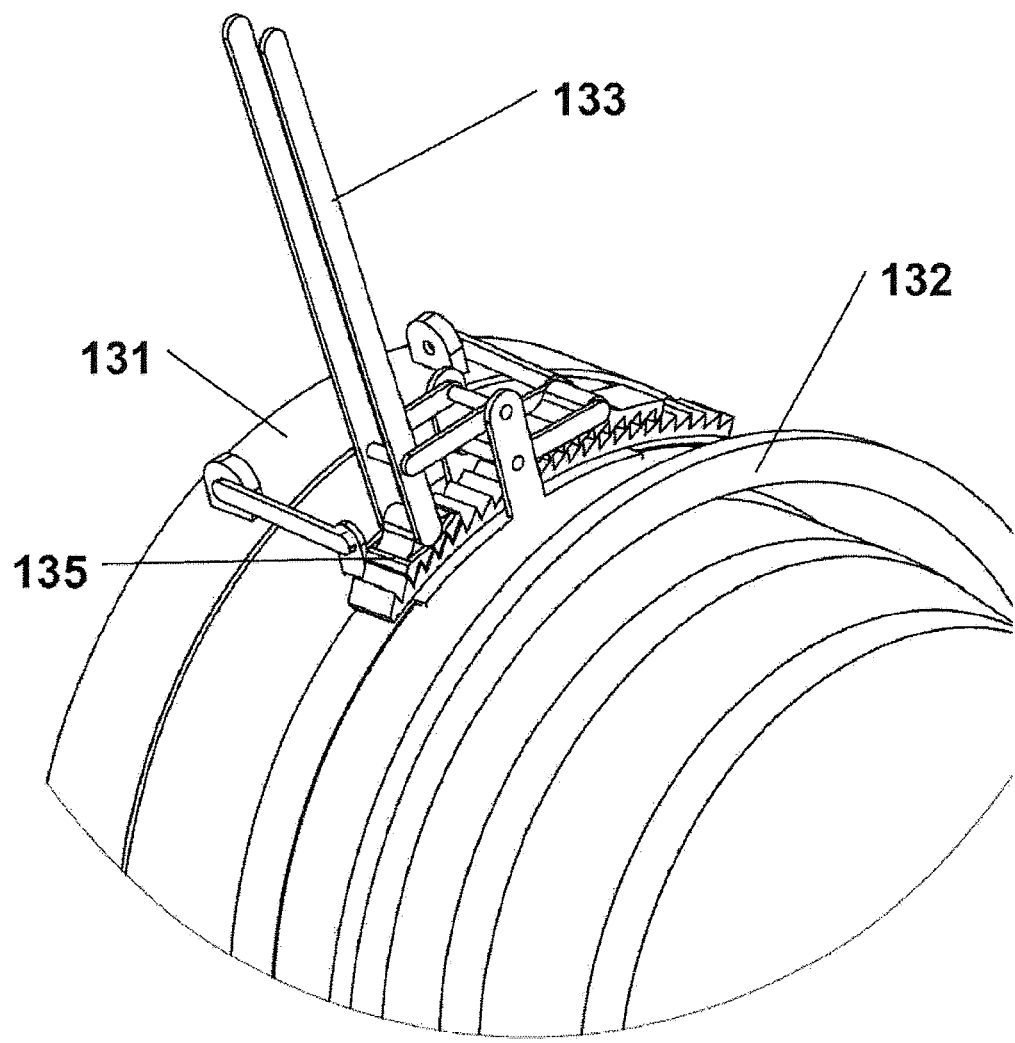
Figure 37:
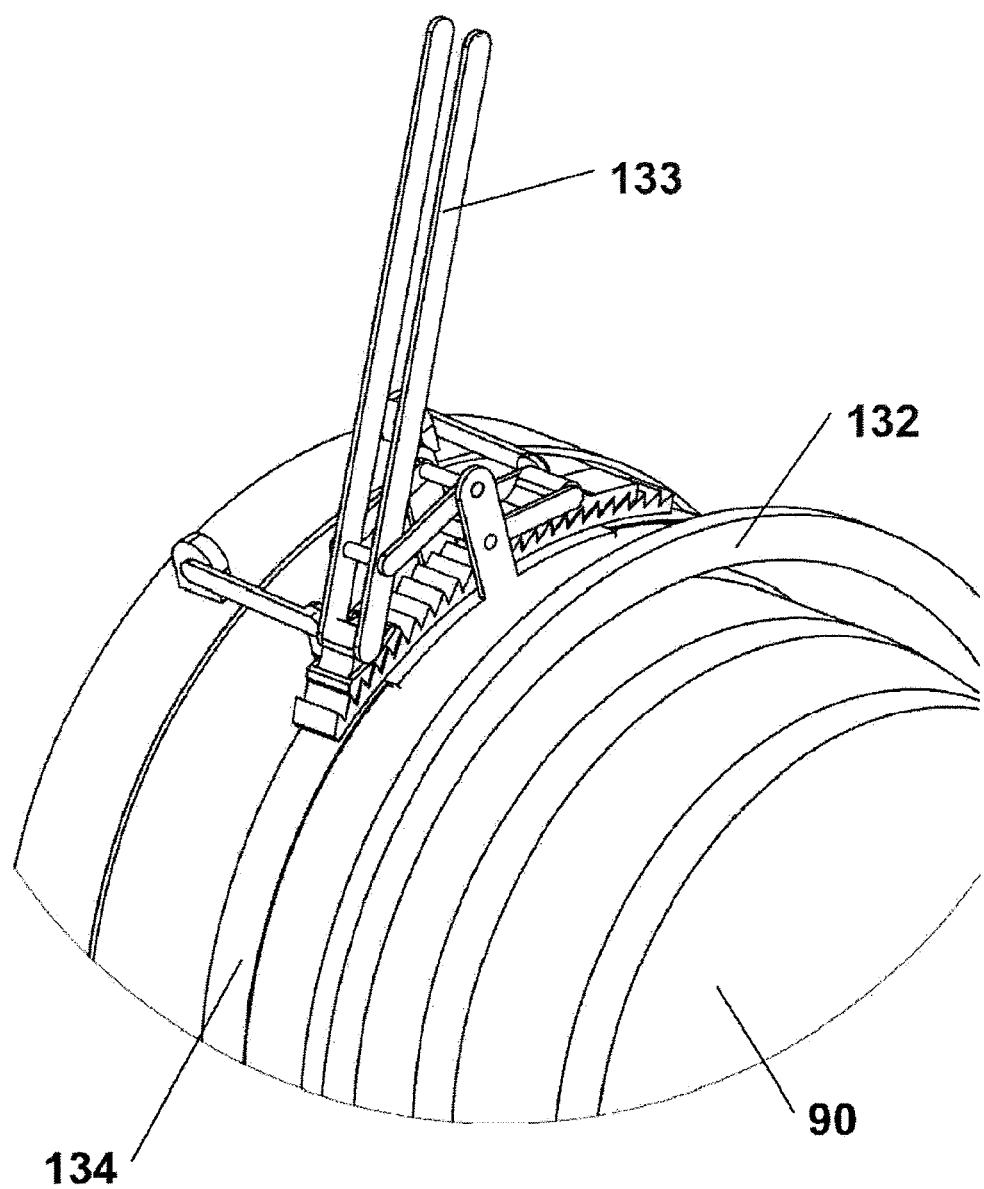
Figure 38:
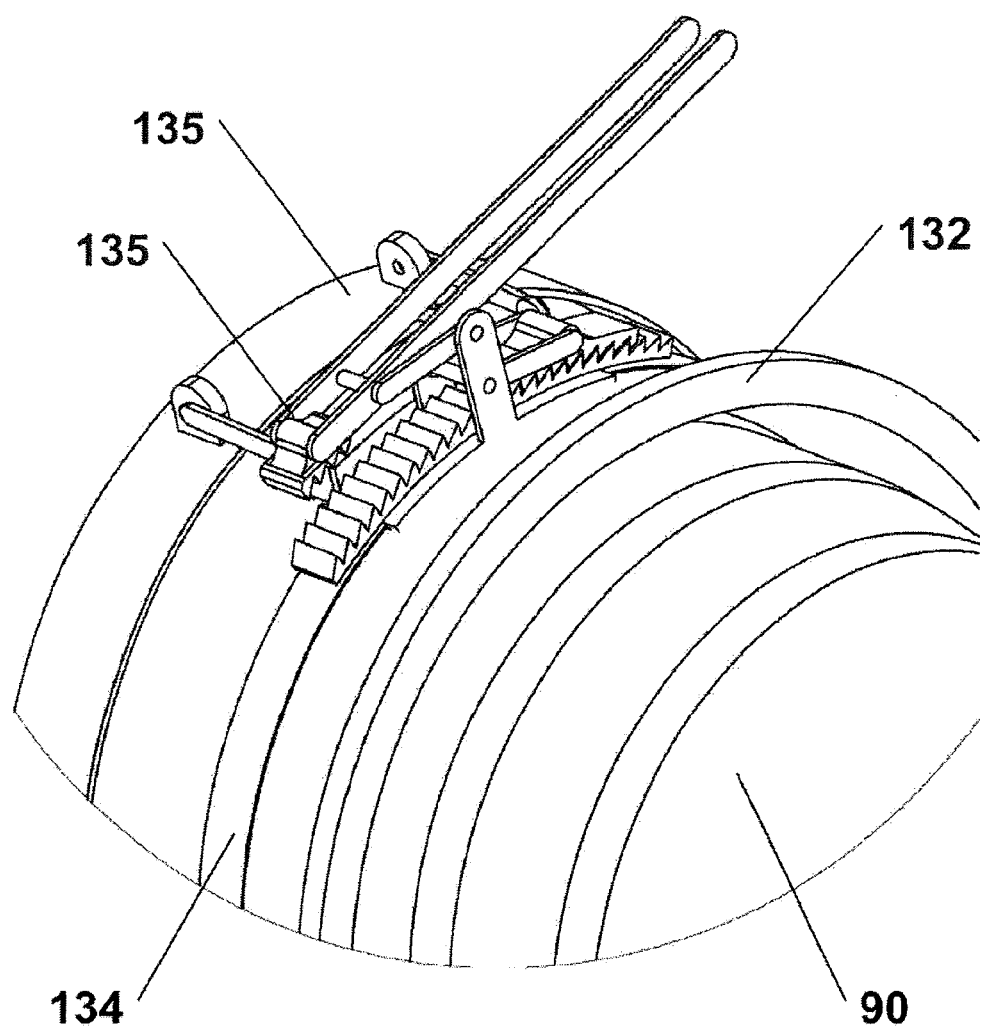
Figure 39:
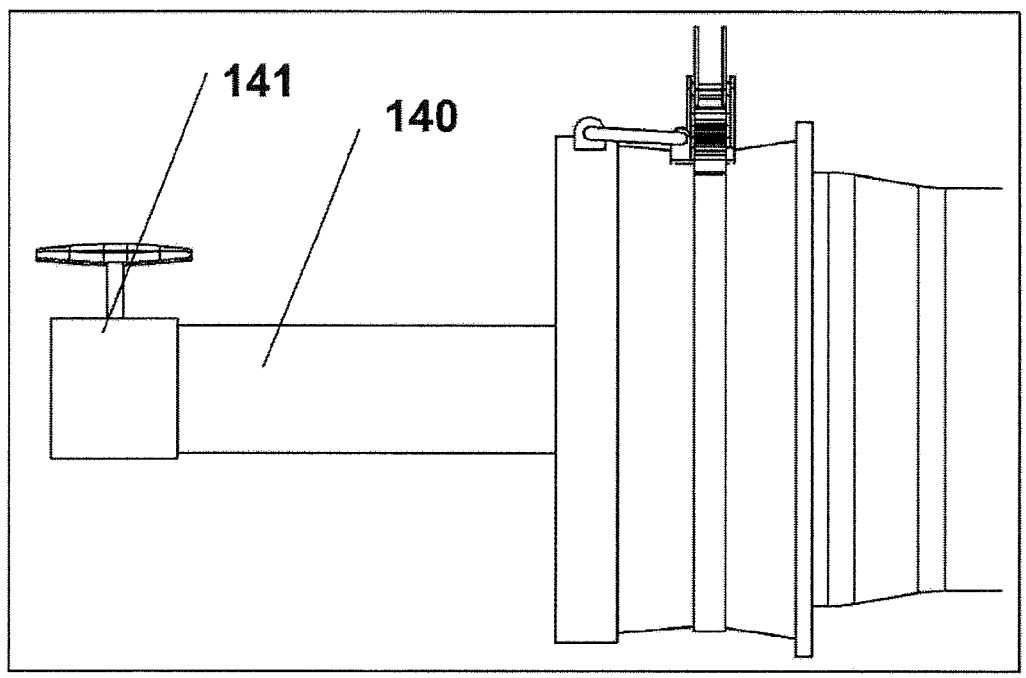

Referring to FIGS. 31 through 33, the resting fixture embodiment is a simplified means for temporarily capping the pipe end. The cylindrical body (101) has a resilient insert (102) disposed on the closed end portion of the cylindrical body (101) inside surface. At least one resilient rib (105) is disposed on the cylindrical body (101) inside surface and adjacent the pipe. A striker projection (100) is located on the closed end outer surface of the fixture. The fixture open end is cut tapered toward the fixture closed end, in a direction opposite the lifting means (130), thereby allowing the fixture to install perpendicular and rest atop the pipe.

Referring to FIGS. 34 through 39, the protective cap resilient bucket embodiment is shown. In this embodiment, the cylindrical body is shortened and simplified to serve as only a protective cap. The cylindrical body (131) only covers a portion of the resilient bucket (132) disposed on the closed end portion of the cylindrical body (131) inside surface. A ratchet band (134) wraps around the resilient bucket (132). The cylindrical body (131) is coupled to the ratchet band (134). At least one folding ratchet arm (133) is mounted to the ratchet band (134). The folding ratchet arm (133) further has a ratchet stop (135), formed as a mating ratchet teeth segment, to engage with ratchet teeth (136) and fold to a closed position thereby securely cinching the resilient bucket (132) to the pipe (90). Optionally, the fixture includes a relief pipe (140) mounted through the cylindrical body and in fluid communication with the fluid medium of the pipe (90). An optional relief valve (141) is mounted on the relief pipe (140).

Another embodiment of the resilient bucket, similar to FIGS. 34 through 39, provides a means for snapping (not shown in drawings) the resilient bucket to the pipe. The means for snapping, for example, is structurally and functionally similar to snap rings, snap nuts, or snap caps used for frictionally securing devices to axles or other generally round parts. The means for snapping can be a series of projections protruding from the inside perimeter surface of the resilient bucket that grab the outside surface of the pipe at frictional contact points. The projections can be any shape suitable for frictionally locking the resilient bucket to the pipe including half-moon or semi-circular 'biscuits' embedded in the resilient bucket. Optionally, this embodiment includes at least one of the shortened cylindrical body and the ratchet band shown in the figures.

While there has been shown and described what are at present considered the preferred embodiments of the invention, it will be obvious to those skilled in the art that various changes and modifications can be made therein without departing from the scope.

The invention claimed is:

1. A pipe brake fixture comprising;
   a pipe,
   a yoke removably disposed on said pipe,
   at least two articulating jaws disposed on said yoke,
   at least two handles disposed on said at least two jaws,
   a means for aligning said fixture on said pipe,
   a means for locking said at least two handles in position thereby forming a contact surface between said fixture and said pipe, and
   a means for pressing said fixture along the pipe center axis direction thereby shifting said fixture into an inclined position thereby forming an eccentric shaped contact surface that increases the friction coefficient at said eccentric shaped contact surface.

2. A pipe brake fixture for holding a first pipe from longitudinal movement relative to an adjacent second pipe, comprising:
   a yoke removably disposed on a first pipe inserted at one end into an open bell of s second pipe, said yoke positioned proximate the open bell of the second pipe,
   a pair of opposing articulating jaws disposed on said yoke,
   a pair of handles each operatively disposed on a respective one of the pair of opposing jaws for moving the yoke from a first position for sliding positioning of the yoke on the first pipe and a second position holding the yoke in locked contacting engagement on the first pipe against the bell of the second pipe; and
   means for pressing said yoke along the pipe center axis direction thereby shifting said yoke into an inclined position and forming an eccentric shaped contact surface that increases the friction coefficient at said eccentric shaped contact surface, for holding the first pipe from movement along the pipe center axis direction into the second pipe.

3. The pipe brake fixture as recited in claim 2, further comprising means for locking said at least two handles in position thereby holding the contact surface between said yoke and said first pipe.

\* \* \* \* \*